US012580779B2

(12) United States Patent
Batcher et al.

(10) Patent No.: US 12,580,779 B2
(45) Date of Patent: Mar. 17, 2026

(54) INDUSTRIAL AUTOMATION MANUFACTURING WITH NFTs AND SMART CONTRACTS

(71) Applicant: Rockwell Automation Technologies, Inc., Mayfield Heights, OH (US)

(72) Inventors: Kenneth W. Batcher, Hudson, OH (US); Sharath Chander Reddy Baddam, Twinsburg, OH (US); Juergen Weinhofer, Chagrin, OH (US); Timothy S. Biernat, Franklin, WI (US); David A. Vasko, Hartland, WI (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 221 days.

(21) Appl. No.: 17/936,126

(22) Filed: Sep. 28, 2022

(65) Prior Publication Data

US 2024/0106666 A1    Mar. 28, 2024

Related U.S. Application Data

(62) Division of application No. 17/934,979, filed on Sep. 23, 2022.

(51) Int. Cl.
 *H04L 9/00* (2022.01)
 *G06Q 20/06* (2012.01)
 *G06Q 20/40* (2012.01)

(52) U.S. Cl.
 CPC ............. *H04L 9/50* (2022.05); *G06Q 20/065* (2013.01); *G06Q 20/401* (2013.01)

(58) Field of Classification Search
 CPC ........................... G06Q 20/065; G06Q 20/401
 See application file for complete search history.

(56) References Cited

U.S. PATENT DOCUMENTS

| | | | |
|---|---|---|---|
| 9,864,365 B2 | 1/2018 | Reid et al. | |
| 10,505,726 B1 | 12/2019 | Andon et al. | |

(Continued)

FOREIGN PATENT DOCUMENTS

| | | |
|---|---|---|
| WO | 2021/178900 A1 | 9/2021 |
| WO | 2021/211814 A1 | 10/2021 |

OTHER PUBLICATIONS

Extended European Search Report received for European Patent Application Serial No. 23188087.3 dated Apr. 24, 2024, 11 pages.

(Continued)

*Primary Examiner* — Esther B. Henderson

(74) *Attorney, Agent, or Firm* — Amin, Turocy & Watson, LLP

(57) ABSTRACT

Industrial blockchain enabled automation control (e.g., using a computerized tool) is enabled. For example, a system can comprise: a memory that stores executable components, a processor, operatively coupled to the memory, that executes the executable components, the executable components comprising: a contract component that determines whether a product generated using industrial automation equipment satisfies a defined condition of a smart contract, and an execution component that, in response to product being determined to satisfy the defined condition, executes a defined term of the smart contract.

20 Claims, 28 Drawing Sheets

(56) References Cited

U.S. PATENT DOCUMENTS

| | | | |
|---|---|---|---|
| 11,487,852 B2 | 11/2022 | Rahiman et al. | |
| 2002/0022971 A1 | 2/2002 | Tanaka et al. | |
| 2002/0108054 A1 | 8/2002 | Moore et al. | |
| 2002/0128842 A1 | 9/2002 | Hoi et al. | |
| 2002/0194010 A1 | 12/2002 | Bergler et al. | |
| 2010/0198873 A1 | 8/2010 | Falk et al. | |
| 2011/0167503 A1 | 7/2011 | Horal et al. | |
| 2018/0012008 A1 | 1/2018 | Withrow et al. | |
| 2018/0117447 A1 | 5/2018 | Tran et al. | |
| 2018/0183606 A1 | 6/2018 | High et al. | |
| 2018/0314809 A1 | 11/2018 | Mintz et al. | |
| 2019/0188787 A1* | 6/2019 | Besanson Tuma | ... H04L 9/0637 |
| 2019/0379642 A1 | 12/2019 | Simons et al. | |
| 2020/0110856 A1 | 4/2020 | Kohvakka et al. | |
| 2020/0151718 A1* | 5/2020 | Yao | G06Q 20/405 |
| 2020/0201620 A1 | 6/2020 | Beard | |
| 2020/0250683 A1 | 8/2020 | Padmanabhan et al. | |
| 2020/0334032 A1 | 10/2020 | Smith | |
| 2021/0012447 A1 | 1/2021 | Glaude et al. | |
| 2021/0174378 A1 | 6/2021 | Rahimizad et al. | |
| 2021/0248653 A1 | 8/2021 | McKenzie et al. | |
| 2021/0256070 A1 | 8/2021 | Tran et al. | |
| 2022/0058636 A1* | 2/2022 | Yantis | G06Q 20/38215 |
| 2022/0237267 A1 | 7/2022 | Diaz et al. | |
| 2022/0261882 A1 | 8/2022 | Youb et al. | |
| 2022/0391895 A1 | 12/2022 | Weber et al. | |
| 2023/0054904 A1 | 2/2023 | Crowley et al. | |
| 2023/0110037 A1* | 4/2023 | Cella | G05B 13/0265 |
| | | | 700/117 |
| 2023/0130182 A1 | 4/2023 | Mir et al. | |
| 2023/0173395 A1* | 6/2023 | Cella | G06N 3/0475 |
| | | | 463/25 |
| 2023/0196342 A1 | 6/2023 | Mullen et al. | |
| 2023/0245102 A1 | 8/2023 | Mistele | |
| 2023/0315819 A1* | 10/2023 | Guy | A63F 13/73 |
| | | | 726/28 |
| 2023/0342435 A1 | 10/2023 | Patange et al. | |
| 2024/0095313 A1 | 3/2024 | Billings et al. | |
| 2024/0193684 A1* | 6/2024 | Bai | G06Q 30/018 |
| 2024/0202721 A1 | 6/2024 | Hu | |

OTHER PUBLICATIONS

Non-Final Office Action received for U.S. Appl. No. 17/934,979, dated Oct. 18, 2024, 25 pages.

Non-Final Office Action received for U.S. Appl. No. 17/936,135, dated Dec. 17, 2024, 30 pages.

Notice of Allowance received for U.S. Appl. No. 17/934,979 dated Feb. 18, 2025, 24 pages.

Final Office Action received for U.S. Appl. No. 17/936,135 dated Jul. 7, 2025, 16 pages.

Non-Final Office Action received for U.S. Appl. No. 17/936,135 dated Oct. 16, 2025, 19 pages.

Notice of Allowance received for U.S. Appl. No. 17/936,135 dated Jan. 9, 2026. 29 pgs.

* cited by examiner

BLOCKCHAIN ECOSYSTEM

602

BLOCKCHAIN SYSTEM #1

604₁

BLOCKCHAIN SYSTEM #2

604₂

• • •

BLOCKCHAIN SYSTEM #N

604ₙ

BLOCKCHAIN SYSTEM

BLOCKCHAIN DEVICE #1

606₁

212₁

BLOCKCHAIN COMPONENT

BLOCKCHAIN DEVICE #2

606₂

212₂

BLOCKCHAIN COMPONENT

• • •

BLOCKCHAIN DEVICE #M

606ₘ

212ₘ

BLOCKCHAIN COMPONENT

BLOCKCHAIN ECOSYSTEM
(SUPPLY CHAIN)

1200

1202 —— DETERMINING WHETHER A PRODUCT GENERATED USING INDUSTRIAL AUTOMATION EQUIPMENT SATISFIES A DEFINED CONDITION OF A SMART CONTRACT

1204 —— DEFINED CRITERION SATISFIED?

NO

YES

1206 —— IN RESPONSE TO PRODUCT BEING DETERMINED TO SATISFY THE DEFINED CONDITION, EXECUTING A DEFINED TERM OF THE SMART CONTRACT

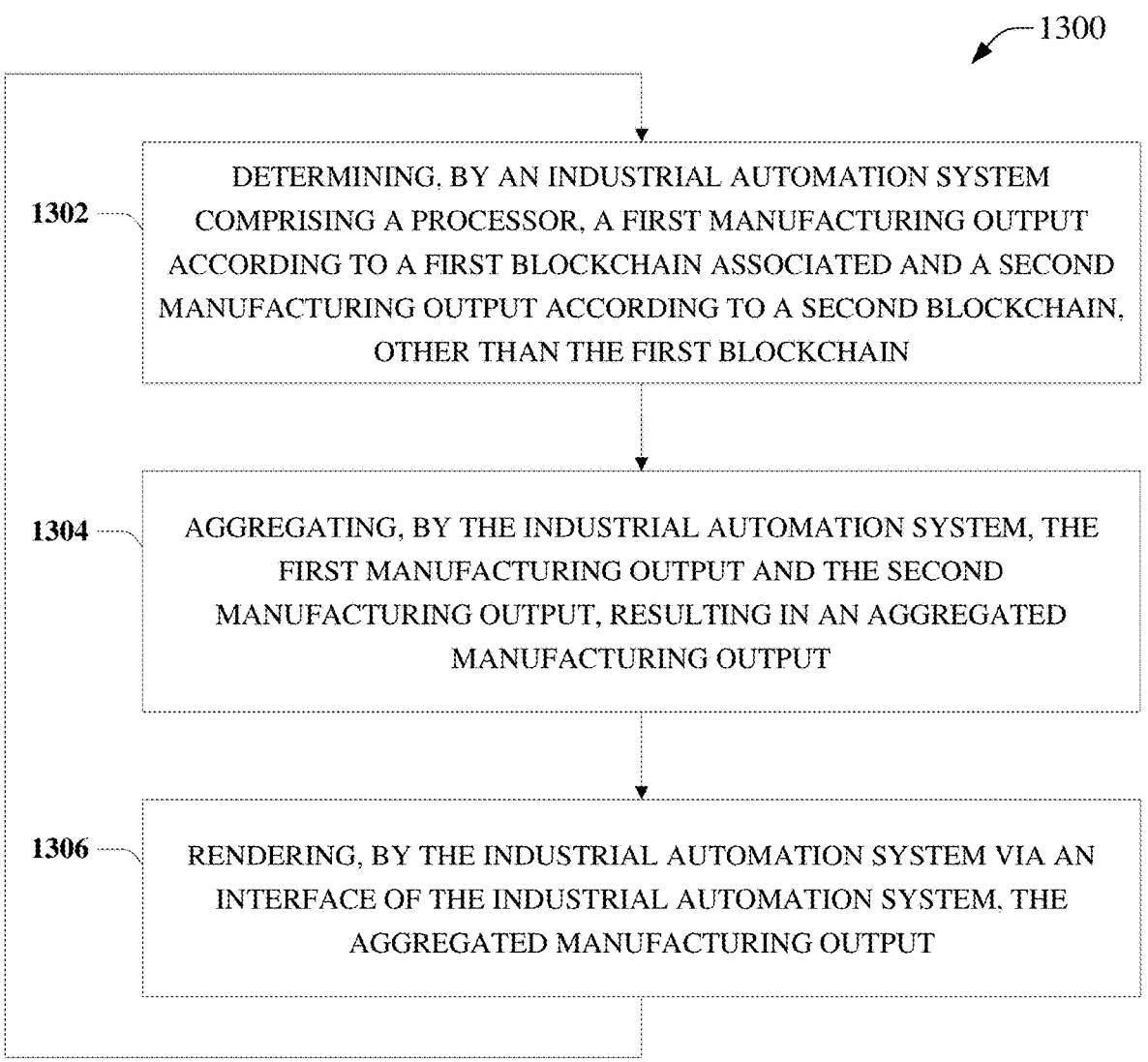

1300

1302 — DETERMINING, BY AN INDUSTRIAL AUTOMATION SYSTEM COMPRISING A PROCESSOR, A FIRST MANUFACTURING OUTPUT ACCORDING TO A FIRST BLOCKCHAIN ASSOCIATED AND A SECOND MANUFACTURING OUTPUT ACCORDING TO A SECOND BLOCKCHAIN, OTHER THAN THE FIRST BLOCKCHAIN

1304 — AGGREGATING, BY THE INDUSTRIAL AUTOMATION SYSTEM, THE FIRST MANUFACTURING OUTPUT AND THE SECOND MANUFACTURING OUTPUT, RESULTING IN AN AGGREGATED MANUFACTURING OUTPUT

1306 — RENDERING, BY THE INDUSTRIAL AUTOMATION SYSTEM VIA AN INTERFACE OF THE INDUSTRIAL AUTOMATION SYSTEM, THE AGGREGATED MANUFACTURING OUTPUT

1402 — DETERMINING WHETHER A DEFINED EVENT ASSOCIATED WITH INDUSTRIAL AUTOMATION EQUIPMENT HAS OCCURRED

1404 — DEFINED CRITERION SATISFIED?

NO

YES

1406 — IN RESPONSE TO THE DEFINED EVENT BEING DETERMINED TO HAVE OCCURRED, STORING DATA REPRESENTATIVE OF THE OCCURRENCE OF THE DEFINED EVENT TO AN INDUSTRIAL BLOCKCHAIN

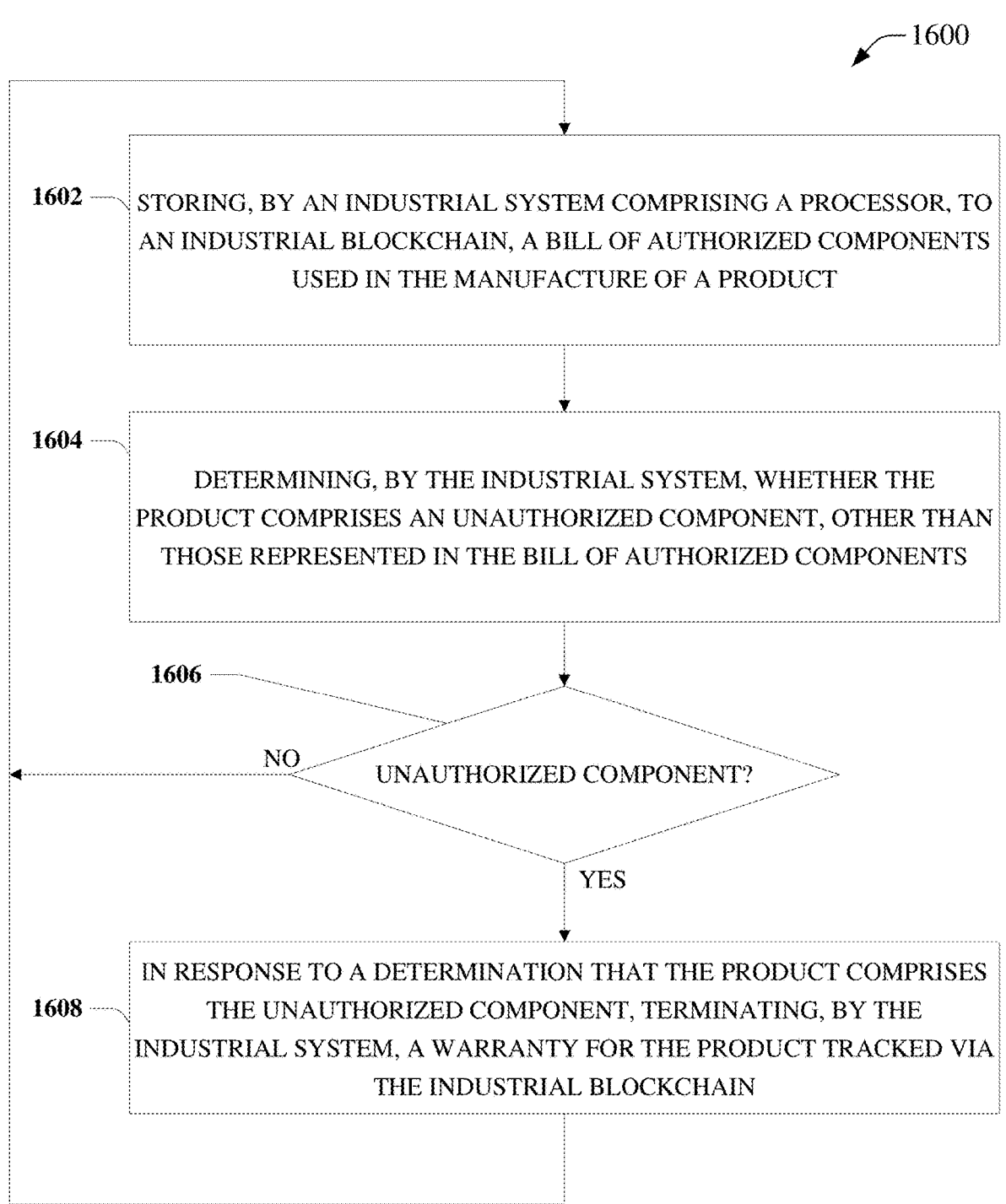

1600

1602 — STORING, BY AN INDUSTRIAL SYSTEM COMPRISING A PROCESSOR, TO AN INDUSTRIAL BLOCKCHAIN, A BILL OF AUTHORIZED COMPONENTS USED IN THE MANUFACTURE OF A PRODUCT

1604 — DETERMINING, BY THE INDUSTRIAL SYSTEM, WHETHER THE PRODUCT COMPRISES AN UNAUTHORIZED COMPONENT, OTHER THAN THOSE REPRESENTED IN THE BILL OF AUTHORIZED COMPONENTS

1606 — UNAUTHORIZED COMPONENT?

NO

YES

1608 — IN RESPONSE TO A DETERMINATION THAT THE PRODUCT COMPRISES THE UNAUTHORIZED COMPONENT, TERMINATING, BY THE INDUSTRIAL SYSTEM, A WARRANTY FOR THE PRODUCT TRACKED VIA THE INDUSTRIAL BLOCKCHAIN

FIG. 16

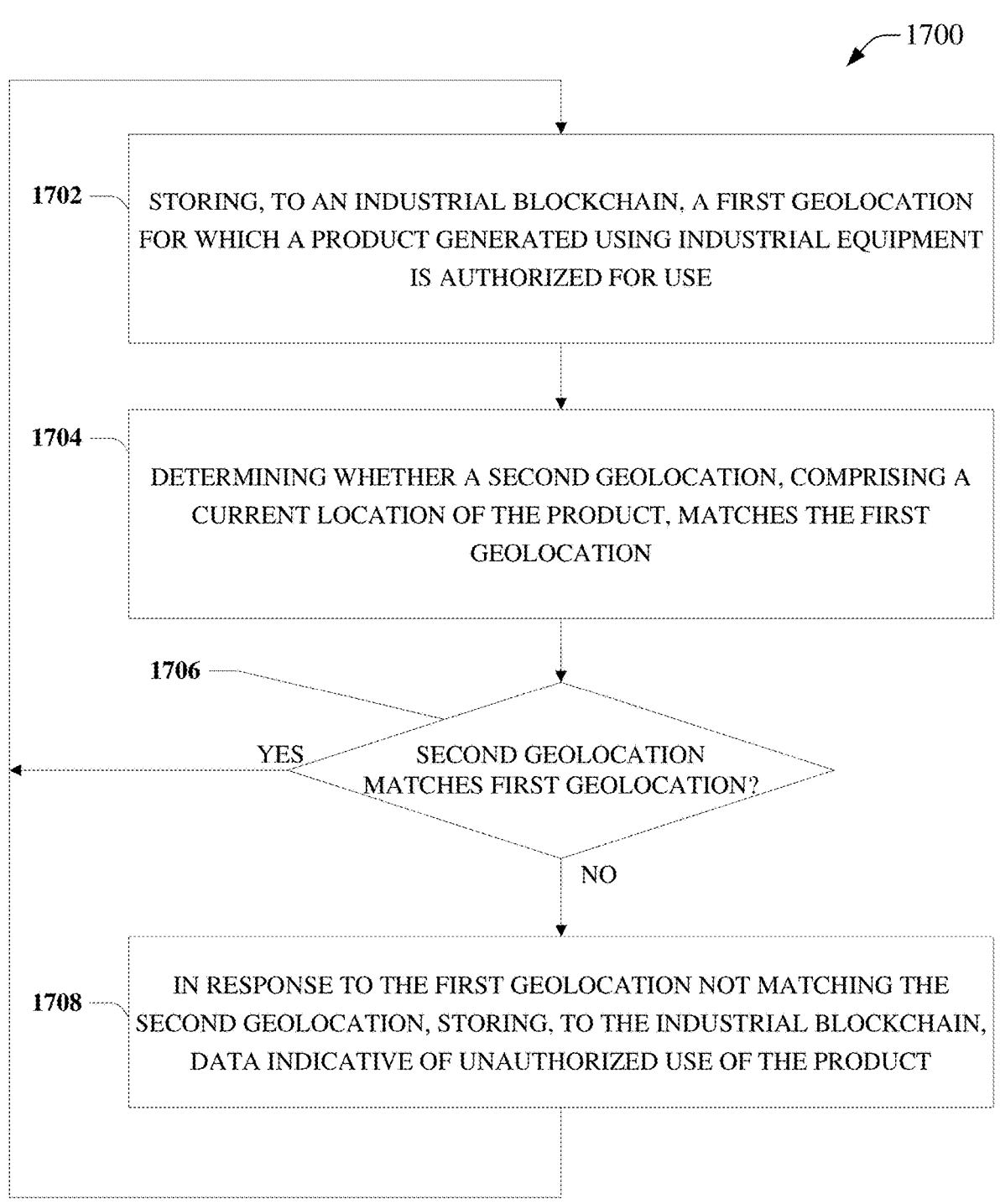

1700

1702 — STORING, TO AN INDUSTRIAL BLOCKCHAIN, A FIRST GEOLOCATION FOR WHICH A PRODUCT GENERATED USING INDUSTRIAL EQUIPMENT IS AUTHORIZED FOR USE

1704 — DETERMINING WHETHER A SECOND GEOLOCATION, COMPRISING A CURRENT LOCATION OF THE PRODUCT, MATCHES THE FIRST GEOLOCATION

1706 — SECOND GEOLOCATION MATCHES FIRST GEOLOCATION?

YES

NO

1708 — IN RESPONSE TO THE FIRST GEOLOCATION NOT MATCHING THE SECOND GEOLOCATION, STORING, TO THE INDUSTRIAL BLOCKCHAIN, DATA INDICATIVE OF UNAUTHORIZED USE OF THE PRODUCT

FIG. 17

INDUSTRIAL AUTOMATION MANUFACTURING WITH NFTs AND SMART CONTRACTS

CROSS-REFERENCE TO RELATED APPLICATIONS

This patent application is a divisional of, and claims priority to, U.S. patent application Ser. No. 17/934,979, filed on Sep. 23, 2022, and entitled "INDUSTRIAL BLOCK-CHAIN ENABLED AUTOMATION CONTROL," the entirety of which is incorporated herein by reference.

BACKGROUND

The subject matter disclosed herein relates generally to industrial automation systems and, more particularly, industrial automation manufacturing with NFTs and smart contracts.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

According to an embodiment, a system can comprise: a memory that stores executable components, and a processor, operatively coupled to the memory, that executes the executable components, the executable components comprising: a contract component that determines whether a product generated using industrial automation equipment satisfies a defined condition of a smart contract, and an execution component that, in response to product being determined to satisfy the defined condition, executes a defined term of the smart contract.

In another embodiment, a method can comprise: determining, by an industrial automation system comprising a processor, a first manufacturing output according to a first blockchain associated and a second manufacturing output according to a second blockchain, other than the first blockchain, aggregating, by the industrial automation system, the first manufacturing output and the second manufacturing output, resulting in an aggregated manufacturing output, and rendering, by the industrial automation system via an interface of the industrial automation system, the aggregated manufacturing output.

In yet another embodiment, a non-transitory computer-readable medium can have stored thereon instructions that, in response to execution, cause an industrial device comprising a processor to perform operations, the operations comprising: determining whether a defined event associated with industrial automation equipment has occurred, and in response to the defined event being determined to have occurred, storing data representative of the occurrence of the defined event to an industrial blockchain.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 13 is a block flow diagram of a process associated with industrial automation manufacturing with NFTs and smart contracts in accordance with one or more embodiments described herein.

FIG. 16 is a block flow diagram of a process associated with tokenized industrial automation software in accordance with one or more embodiments described herein.

FIG. 17 is a block flow diagram of a process associated with tokenized industrial automation software in accordance with one or more embodiments described herein.

DETAILED DESCRIPTION

Figure 1:
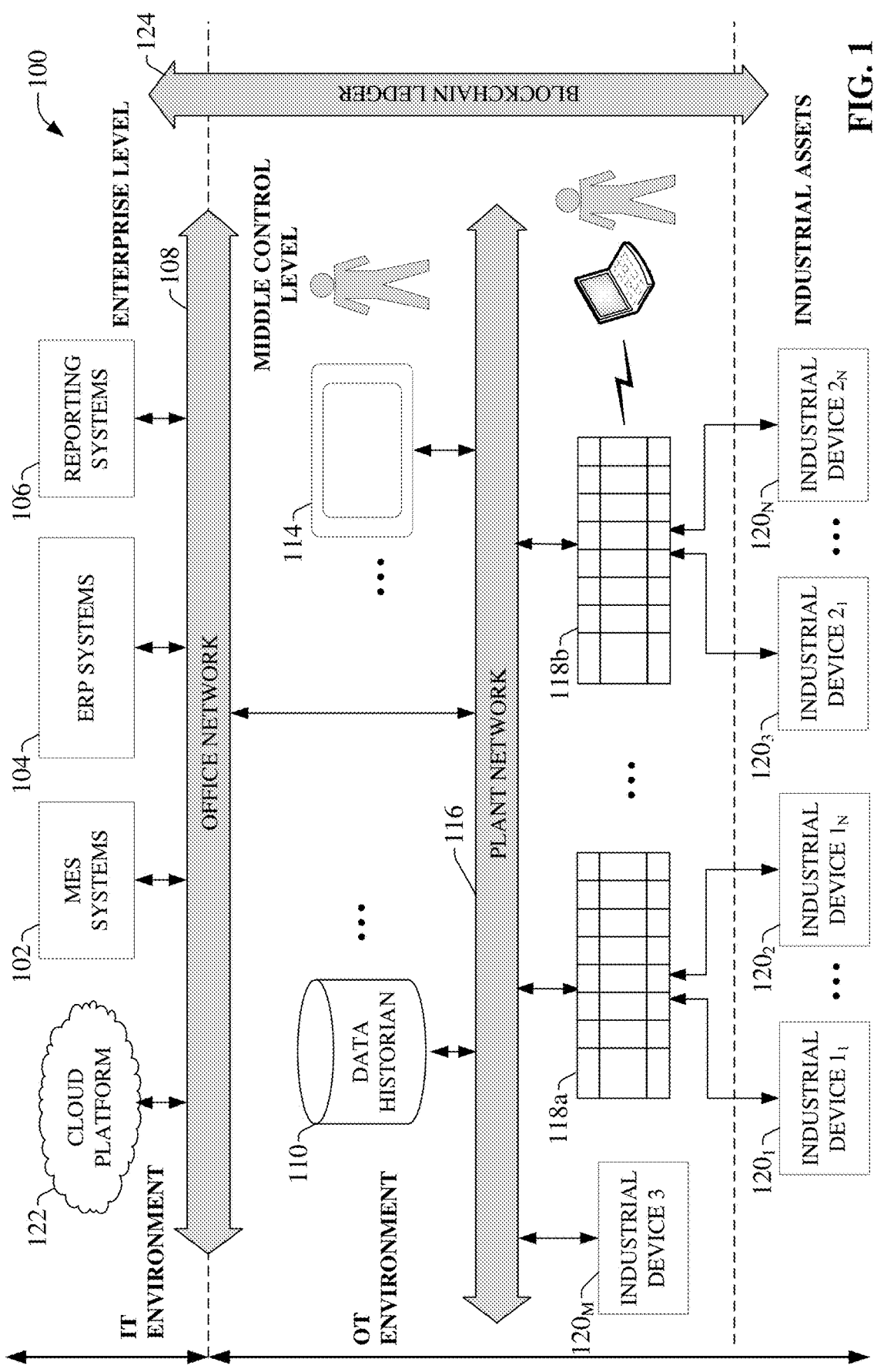
FIG. 1 is a block diagram of an example industrial control environment in accordance with one or more embodiments described herein.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that can comprise a number of devices, components, modules, and the like. It is to be understood and appreciated that the various systems can comprise additional devices, components, modules, etc. and/or may not include all of the devices, components, modules etc. discussed in connection with the figures. A combination of these approaches also can be used.

FIG. 1 is a block diagram of an example industrial environment 100. In this example, a number of industrial controllers 118 (e.g., industrial automation devices, equipment, systems, etc.) can be deployed throughout an industrial plant environment (e.g., to monitor and control respective industrial systems or processes relating to product manufacture, machining, motion control, batch processing, material handling, or other suitable industrial functions). In various embodiments, industrial controllers 118 can execute respective control programs to facilitate monitoring and control of industrial devices 120 making up the controlled industrial assets or systems (e.g., industrial machines). One or more industrial controllers 118 can additionally or alternatively comprise a soft controller (e.g., executed on a personal computer, on a server blade, or other hardware platform, or on a cloud platform). Some hybrid devices can additionally or alternatively combine controller functionality with other functions (e.g., visualization). The control programs executed by industrial controllers 118 can comprise any conceivable type of code used to process input signals read from the industrial devices 120 and to control output signals generated by the industrial controllers, including but not limited to ladder logic, sequential function charts, function block diagrams, structured text, C++, Python, JavaScript, etc.

In one or more embodiments, industrial devices 120 can comprise input devices that provide data relating to the controlled industrial systems to the industrial controllers 118, output devices that respond to control signals generated by the industrial controllers 118 to control aspects of the industrial systems, and/or devices that act as both input and output devices. Exemplary input devices can comprise telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and/or other suitable telemetry devices. Output devices can comprise motor drives, pneumatic actuators, signaling devices, robot control inputs, valves, and/or other suitable output devices. Some industrial devices, such as industrial device 120M, can operate autonomously on the plant network 116 (e.g., without being controlled by an industrial controller 118).

In various implementations, industrial controllers 118 can communicatively interface with industrial devices 120 over hardwired connections or over wired or wireless networks. For example, industrial controllers 118 can be equipped with native hardwired inputs and outputs (e.g., that communicate with the industrial devices 120 to effect control of the devices). The native controller I/O can comprise digital I/O that transmits and receives discrete voltage signals to and from the field devices and/or analog I/O that transmits and receives analog voltage or current signals to and from the devices. The controller I/O can communicate with a controller's processor over a backplane (e.g., such that the digital and analog signals can be read into and controlled by the control programs). Industrial controllers 118 can additionally or alternatively communicate with industrial devices 120 over the plant network 116 using, for instance, a communication module or an integrated networking port. Exemplary networks can comprise the Internet, intranets, Ethernet, EtherNet/IP, DeviceNet, ControlNet, Data Highway and Data Highway Plus (DH/DH+), Remote I/O, Fieldbus, Modbus, Profibus, wireless networks, serial protocols, and the like. The industrial controllers 118 can additionally or alternatively store persisted data values that can be referenced by the control program and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices (e.g., including but not limited to motor drives, instruments, or condition monitoring modules) can store data values that are used for control and/or to visualize states of operation. Such devices can additionally or alternatively capture time-series data or events on a log for later retrieval and viewing.

Industrial automation systems herein can comprise one or more human-machine interfaces (HMIs) 114 that can enable plant personnel to view telemetry and status data associated with the automation systems and/or to control some aspects of system operation. HMIs 114 can communicate with one or more of the industrial controllers 118 over a plant network 116, and/or exchange data with the industrial controllers to facilitate visualization of information relating to the controlled industrial processes on one or more pre-developed operator interface screens. HMIs 114 can additionally or alternatively be configured to enable operators to submit data to specified data tags or memory addresses of the industrial controllers 118, thereby providing a means for operators to issue commands to the controlled systems (e.g., cycle start commands, device actuation commands, etc.) to modify setpoint values, etc. HMIs 114 can generate one or more display screens through which the operator interacts with the industrial controllers 118, and thereby with the controlled processes and/or systems. Exemplary display screens of one or more embodiments herein can visualize present states of industrial systems or their associated devices using graphical representations of the processes that display metered or calculated values, employ color or position animations based on state, render alarm notifications, and/or employ other such techniques for presenting relevant data to the operator. Data presented in this manner can be read from industrial controllers 118 by HMIs 114 and presented on one or more of the display screens according to display formats chosen by the HMI developer. HMIs can comprise fixed location or mobile devices with either user-installed or pre-installed operating systems, and either user-installed or pre-installed graphical application software.

Some industrial environments can additionally or alternatively comprise other suitable systems or devices relating to specific aspects of the controlled industrial systems. For example, one or more data historians 110 can aggregate and/or store production information collected from the industrial controllers 118 and other industrial devices.

Industrial devices 120, industrial controllers 118, HMIs 114, associated controlled industrial assets, and/or other plant-floor systems such as data historians 110, vision systems, and/or other suitable systems can operate on the operational technology (OT) level of the industrial environment. Higher level analytic and reporting systems can operate at the higher enterprise level of the industrial environment in the information technology (IT) domain (e.g., on an office network 108 or on a cloud platform 122). Such higher-level systems can comprise, for instance, enterprise resource planning (ERP) systems 104 that can integrate and/or collectively manage high-level business operations, such as finance, sales, order management, marketing, human resources, and/or other such business functions. Manufacturing Execution Systems (MES) 102 can monitor and manage control operations on the control level given higher-level business considerations. Reporting systems 106 can collect operational data from industrial devices on the plant floor and generate daily and/or shift reports that summarize operational statistics of the controlled industrial assets. One or more components, devices, systems, etc. of the industrial environment 100 can be configured to utilize or interface with the blockchain ledger 124 (e.g., an immutable blockchain ledger).

Figure 2:
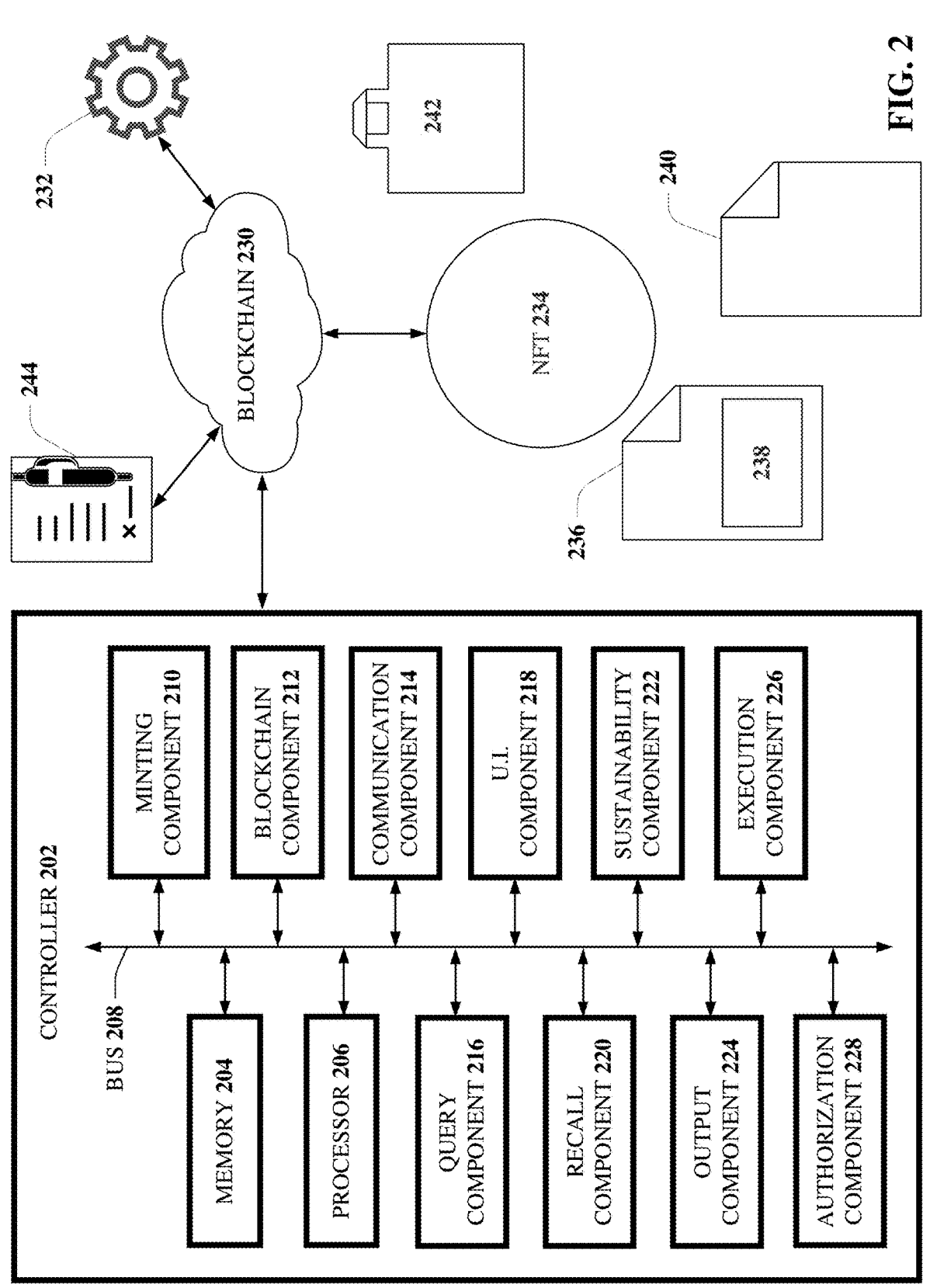
FIG. 2 is a block diagram of an exemplary controller in accordance with one or more embodiments described herein.

FIG. 2 illustrates an example, non-limiting blockchain enabled industrial automation controller 202 in accordance with one or more embodiments herein. Controller 202 can comprise a computerized tool, which can be configured to perform various operations relating to industrial blockchain enabled automation control. The controller 202 can comprise one or more of a variety of components, such as memory 204, processor 206, bus 208, minting component 210, blockchain component 212, communication component 214, query component 216, user interface (U.I.) component 218, recall component 220, sustainability component 222, output component 224, execution component 226, and/or authorization component 228. In various embodiments, the controller 202 can be communicatively coupled to, or can further comprise, blockchain ledger 230, blockchain oracle 232, non-fungible token (NFT) 234, and/or smart contract 244. In various embodiments, one or more of the memory 204, processor 206, bus 208, minting component 210, blockchain component 212, communication component 214, query component 216, user interface (U.I.) component 218, recall component 220, sustainability component 222, output component 224, execution component 226, authorization component 228, blockchain ledger 230, blockchain oracle 232, NFT 234, and/or smart contract 244 can be communicatively or operably coupled (e.g., over a bus or wireless network) to one another to perform one or more functions of the controller 202. According to an embodiment, the controller 202 can comprise a programmable logic controller (PLC), programmable automation controller (PAC), or other such device.

According to an embodiment, the minting component 210 can, based on a manufacturing criterion associated with a product 242 being determined to be satisfied (e.g., by the minting component 210 or another component of the controller 202), mint an NFT 234, associated with the product 242. Such a manufacturing criterion can comprise any suitable manufacturing criterion, such as a completion of a step or set of steps in the manufacturing of the product 242, a defined quantity of products 242 being produced, a defined amount of time elapsing, or another suitable manufacturing criterion. The NFT 234 (e.g., an instance of the NFT 234) can comprise a unique identifier, uniquely associated with the product 242 (e.g., a unique instance of the product 242). In one or more embodiments, the NFT 234 can comprise authenticity data representative of a birth certificate 236 for the product 242. Such a birth certificate 236 can comprise a serial number associated with the product 242, a bill of materials 238 for the product 242 (e.g., a list of components or raw materials in the product 242), country of origin of the product 242, energy usage or efficiency data associated with the manufacturing of the product 242, manufacturing information associated with the product 242, or other suitable information regarding the product 242. The product 242 can comprise a finished product or component manufactured using industrial automation equipment controlled via the controller 202.

After the minting component 210 mints the NFT 234, the blockchain component 212 can register the NFT 234 with the blockchain 230. In other embodiments, the NFT 234 is concurrently registered (by the minting component 210 or blockchain component 212) with the blockchain 230 upon minting of the NFT 234. In various embodiments, the blockchain 230 can comprise a database distributed across a network of devices or nodes in a network, and can be accessible via a plant network (e.g., plant network 116) or office network (e.g., office network 108), or directly via communicatively coupled devices, systems, components, etc. To write to the blockchain 230 (e.g., by a controller, system, and/or component herein), a request can be broadcast by the blockchain component 212 or minting component 210 to some or all registered participants of the blockchain ledger 230. These participants can include other controllers, devices, systems, or nodes that are authorized to participate in the blockchain ecosystem. Every registered participant can check hashes against defined blockchain algorithms in order to validate the request to write to the blockchain 230. Using a defined proof of work algorithm, participants of the blockchain ledger 230 can determine validity of the new block(s). Validity of the new block(s) can be determined based upon the participants reaching a consensus or a defined threshold for agreement (e.g., according to a defined agreement criterion) for determining validity. If consensus or a defined agreement is reached, the new block(s) can be added to the blockchain ledger 230. In some embodiments, the immutable blockchain ledger 230 can be associated exclusively with the controller 202, thus yielding a 1:1 relationship between blockchain ledgers and controllers (and/or systems herein) in which each blockchain ledger is associated with only one controller or system. In other embodiments, a single immutable blockchain ledger 230 can be associated with a plurality of controllers and/or systems described herein. In some embodiments, rather than storing entire datasets to the blockchain 230, fingerprints representative of such datasets can be stored to the blockchain 230. In various embodiments, such fingerprints can be generated using a defined hash or checksum algorithm. It is noted that the blockchain ledger 230 can capture sequence(s) of operations. In this regard, operations A,B,C can yield different results as compared to the same operations in order C,A,B. The foregoing principle can be utilized, for instance, by a system herein, to calibrate industrial automation equipment before generating products using the industrial automation equipment, thus enforcing that operations applied to a device were actually applied (e.g., upgraded, installed, etc.) in a correct order. In the event of a failure to validate a block chain query/request a system herein can return message (e.g., via a user interface of a system or controller herein) indicating the reason(s) that the failure occurred (e.g., cannot use feature X because user did not pay yearly membership fee and did not upgrade equipment to the latest revision of software).

According to an embodiment, the communication component 214 can receive a request potentially applicable to the product 242 (e.g., from an external device or entity). It is noted that such a request can comprise an authenticity check of the product 242, for instance, to ensure that the product 242 comprises an authentic instance of the product 242. In this regard, the query component 216 can, based on the request, retrieve the authenticity data from the blockchain 230. In various embodiments, such authenticity data can be represented and/or proven using the NFT 234. In this regard, the unique nature of an instance of the NFT 234, uniquely associated with an instance of the product 242, can be utilized to validate authenticity of that instance of the product 242, for instance, by matching the instance of the product 242 with details proven by the NFT 234 (e.g., creator, the exact day and time minted, quantity, birth certificate, serial number, list of components or raw materials, etc.) The U.I. component 218 can then render the authenticity data via a client device (not depicted) or another suitable output medium. In some embodiments, the above request can comprise an inventory of materials 240 of a product purported to comprise an authentic instance of the product 242. In this regard, the query component 216 can compare the bill of materials 238 to the inventory of materials 240 in order to validate authenticity of the product or item in question. In some embodiments, the U.I. component 218 can render a result of the comparison (by the query component 216 of the bill of materials 238 to the inventory of materials 240) via a client device or another suitable output medium and/or generate an alert in response to the bill of materials 238 not matching the inventory of materials 240. It is noted that the U.I. component 218 can render an output visually (e.g., on screen/display) or audibly and/or communicated to one or more external devices via the communication component 214. According to an embodiment, the U.I. component 218 can perform visualization functions similar to those of HMI 114, including rendering telemetry and/or status data associated with the controller 202 and other systems or components herein. Further, the communication component 214 can send or receive data associated with the controller 202 or other systems or components herein. For example, the communication component 214 can facilitate communication between the controller 202, office network 108, plant network 116, blockchain ledger 124, and/or corresponding devices, systems, components, platforms, etc. In various embodiments, the U.I. component 218 can be configured to receive user input and to render output to the user in any suitable format (e.g., visual, audio, tactile, etc.). In some embodiments, U.I. component 218 can be configured to communicatively interface with a development application that executes on a client device (e.g., a laptop computer, tablet computer, smart phone, etc.) that is communicatively connected to the blockchain-enabled industrial device (e.g., via a hardwired or wireless connection). The U.I. component 218 can then receive user input data and render output data via the development application. In other embodiments, U.I. component 218 can be configured to generate and serve suitable graphical interface screens to a client device, and exchange data via these graphical interface screens. Input data that can be received via U.I. component 218 can include, but is not limited to, user-defined control programs or routines that include industrial blockchain instructions, blockchain configuration parameters (which may be provided as configuration parameters of the blockchain instructions), or other such data. In is additionally noted that the communication component 214 can comprise the hardware required to implement a variety of communication protocols (e.g., infrared ("IR"), shortwave transmission, near-field communication ("NFC"), Bluetooth, Wi-Fi, long-term evolution ("LTE"), 3G, 4G, 5G, 6G, global system for mobile communications ("GSM"), code-division multiple access ("CDMA"), satellite, visual cues, radio waves, etc.)

As discussed above, the communication component 214 can receive a request potentially applicable to the product 242 (e.g., from an external device or entity). In additional embodiments, such a request herein can comprise a recall check or a product or item herein. In this regard, the recall component 220 can determine whether a recall corresponding to the recall check is applicable to the product 242 and, in response to a determination that the recall is applicable to the product, generate an output (e.g., via the U.I. component 218 and/or communication component 214) indicative of the recall of the product 242. Thus, the recall component 220 can compare recall data (e.g., a list of serial numbers or other identifying information) against a plurality of NFTs (e.g., comprising the NFT 234) in order to determine whether any products 242 correspond to a recall.

In one or more embodiments, the NFT 234 and/or birth certificate 236 can additionally comprise sustainability data applicable to the product 242, its respective packaging, production, recycling information, etc. Such sustainability data can comprise $CO_2$ built into a product, recyclability of a product, environmental impact of a product and/or its manufacturing processes, chemicals, energy, water, materials, and waste associated with a product, or other suitable sustainability data. In this regard, the sustainability component 222 can retrieve, from the blockchain 230, sustainability information for one or more raw materials of the product 242. Based on the sustainability information, the sustainability component 222 can generate the sustainability data and store the sustainability data to the blockchain 230 (or store a fingerprint of the sustainability to the blockchain 230).

According to another embodiment, the controller 202 can (e.g., via the output component 224) determine product output of industrial automation equipment herein (e.g., a quantity of products 242 applicable to smart contract 244, rate of production output, measure of a raw material used in a product applicable to the smart contract 244, etc.) In this regard, the blockchain component 212 can write data representative of the product output to the blockchain 230. The execution component 226 can then, in response to a determination by the output component 224 that the above product output satisfies a term of a smart contract 244, facilitate an action defined by the smart contract 244. Such an action can comprise facilitation of a payment associated with the product output (e.g., according to a term of a smart contract or as otherwise defined), generation of an order comprising a raw material applicable to a product produced by the industrial automation equipment (e.g., restocking on raw materials), generating a message comprising message data indicative of the product output and sending the message to a registered participant of the smart contract 244 (e.g., via the communication component 214 and/or U.I. component 218), or another suitable action. In one or more embodiments, the smart contract 244 can be stored on the blockchain 230. To this and various other ends, it is noted that the supply, manufacturing, and distribution chain for a manufactured product extends well beyond the boundaries of a single industrial facility, and crosses boundaries between several interconnected but substantially independent entities. For example, an industrial enterprise (which may comprise one or more manufacturing and warehouse facilities under a common ownership) may receive materials or component parts from one or more supplier entities that produce the materials or parts. The enterprise may also purchase industrial assets (e.g., custom-built machines, motor control cabinets, etc.) from one or more original equipment manufacturers (OEMs). Manufactured products are sold and distributed via retail outlets that may be owned and operated by entities who are independent from the industrial enterprise. While these independent entities may collect and track data generated within their own boundaries as participants in a common supply chain, these various entities may benefit from selective sharing of their collected data. Reliable and trusted sharing of data can be particularly crucial if business contracts between the entities are in place, since this shared information can ensure that the terms of the contracts are being satisfied. However, since each entity's data is typically collected and stored locally (or on protected remote storage, such as a proprietary cloud-based storage platform), shared data owned by one of the entities may not be easily and readily accessible by third parties, and trustworthiness of the shared data may be a concern.

During operation at the manufacturing entity's facility, the blockchain-enabled industrial controller 202 can track a number of production statistics, including an accumulated number of operating cycles performed by the machine, an accumulated amount of time that the machine has run, a number of parts produced by the machine, etc. The controller 202 and/or industrial devices of a machine's control cabinet can record this production data in the blockchain ledger 230. The control devices also record modifications made to the machine or its associated industrial devices by the manufacturing entity. For example, changes made to the firmware of the industrial controller or other control devices as a result of reimaging or patching are recorded in the public blockchain ledger, as are modifications made to the OEM-developed control program or application executed on the industrial controller.

In response to determining that information stored in the public ledger satisfies a criterion (e.g., a criterion defined in a smart contract) indicating that the OEM is contractually obliged to perform a component replacement or other maintenance action on the machine (e.g., in response to execution of a defined number of machine cycles, when the accumulated machine run time exceeds a defined number of operating hours, when the machine has produced a defined number of parts, etc.), the blockchain component 212 can sign, on behalf of the owner, a verifiable and contractually binding component replacement order as a transaction in the blockchain 230.

Since the OEM has access to data stored in the public blockchain, the OEM receives and verifies the component replacement order, and in response ships the necessary machine component to the manufacturing entity. The manufacturing entity installs the replacement component and records a signed conformation of the replacement in the public blockchain ledger. The OEM can use this verified transaction to initiate payment processing. Using this system, the replacement component, the vendor-specific device firmware, and the OEM-specific application are all verifiably tracked in the blockchain ledger 230. The current state reflected in the public blockchain can reflect the authorized production cycle count, which can be viewable by both the OEM and the end user. For subscription-based operation of the machine, the OEM can authorize the production cycle count in the public blockchain ledger based on payment and agreement. The end-user can also set the criteria for the machine to automatically renew additional production authorization at defined thresholds.

According to another embodiment, the communication component 214 can receive a software installation request (e.g., a software installation request applicable to the industrial automation controller 202). In this regard, the authorization component 228 can determine whether the software installation request comprises a request for authorized software, registered with the blockchain 230. To determine various authorizations herein, such as those resulting from valid software requests, the authorization component 228 can be configured to identify authorized software stored on the blockchain 230 based on, for instance, a defined authorization criterion. To this end, some embodiments of the blockchain component 212 can store data representative of the authorized software to the blockchain ledger 230. Data representative of the authorized software can be associated with a corresponding NFT, such as NFT 234, stored to the blockchain ledger 230. In some embodiments, presentation of an authorized NFT can be required in order to access or download authorized software herein. In response to a determination via the authorization component 228 that the above-noted software request comprises authorized software, the execution component 226 can initiate an installation of the authorized software (e.g., based on the request). The installation can be performed according to the request on a device associated with the request (e.g., a controller, industrial automation equipment, or system herein). It is noted that, in various embodiments, the installation of the authorized software can be initiated by the execution component 226 further in response to a determination that the software installation request comprises a presentation or acquisition of a valid license for the authorized software. Such a license can be stored on the blockchain 230. In further embodiments, a fingerprint of the license can be stored on the blockchain 230. The license (e.g., as a smart contract enforced by controller 202 or other systems herein that make up an industrial blockchain ecosystem, such as industrial blockchain ecosystem 602 as later discussed in greater detail with respect to FIG. 6) can prevent unauthorized use of industrial automation software herein. In some implementations, the authorized software can be installed, via the execution component 226 and based on a software installation request, on the industrial automation controller 202 or on industrial automation equipment associated with the industrial automation controller 202, such as assembly machinery, chemical application machinery, computer numerical control equipment, or other suitable industrial automation equipment (e.g., industrial device 120).

Figure 3:
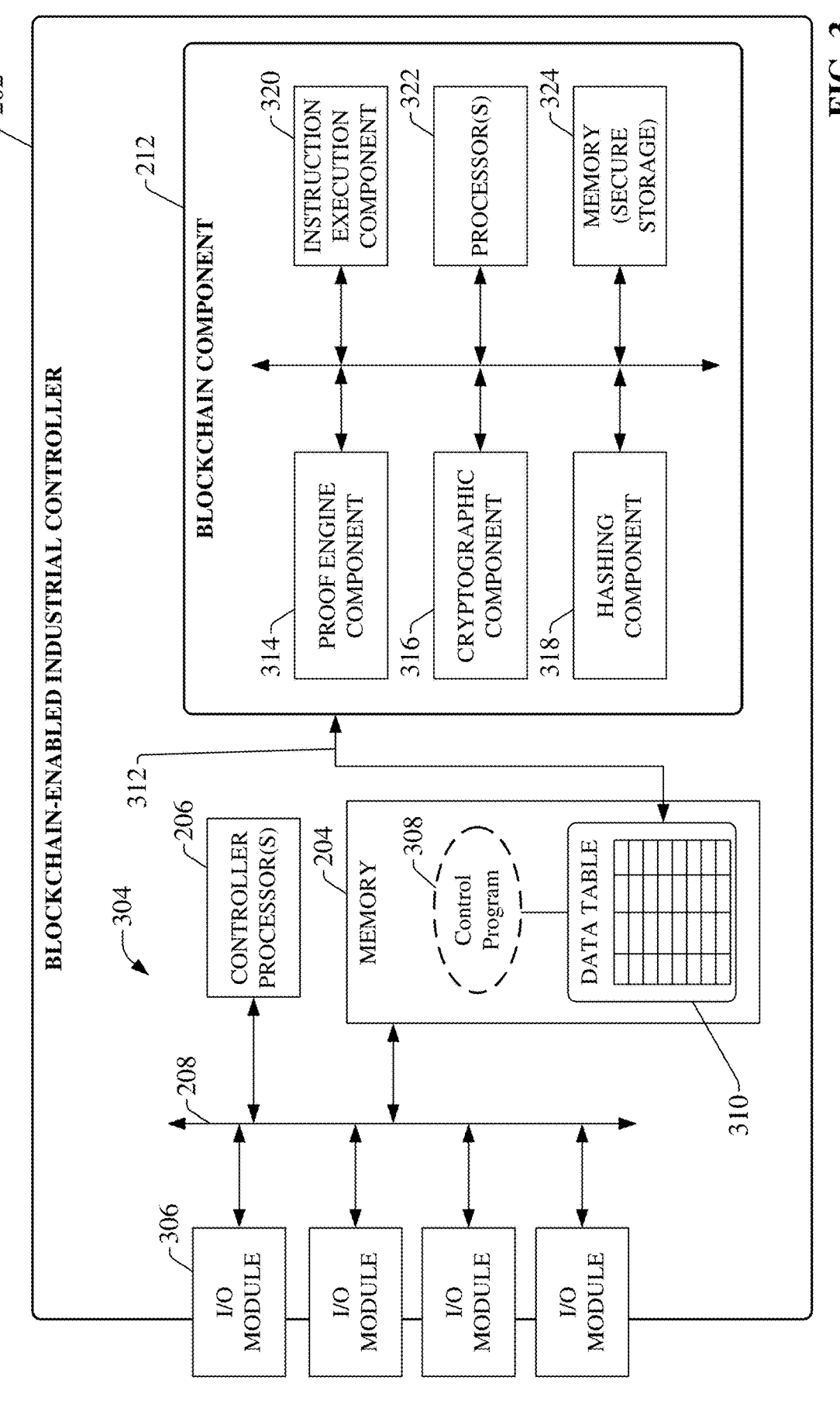
FIG. 3 is a block diagram of an exemplary controller in accordance with one or more embodiments described herein.

FIG. 3 is another diagram of the example blockchain-enabled industrial controller 202, illustrating that hardware and processing resources for carrying out industrial blockchain functions can be segregated from processing resources that carry out the controller's primary control functionality. In this example architecture, control components 304 can include the memory 204 on which is stored the control program 308 executed by the controller 202 and the data table 310 that stores real-time values of the controller's digital and analog inputs and outputs, setpoint values, calculated values, or other data tag values. Control components 304 also include one or more I/O modules 306, which interface the controller 202 with input and output devices (not shown), such an industrial automation equipment, that make up a controlled industrial system or process. I/O modules 306 are communicatively connected to the controller's backplane or communication bus 208, and exchange data with the data table 310 via the backplane. I/O modules 306 can include input modules that measure aspects of the controlled system as digital and/or analog signals (e.g., 4-20 mA signals, 0-10 VDC signals, switched input voltages, etc.) and write these values to designated data tags or memory addresses of data table 310. I/O modules 306 can also include output modules that read digital or analog values from designated data tags or memory addresses of data table 310 and translate these values into output signals (e.g., switched outputs, 4-20 mA output signals, 0-10 VDC output signals, etc.) directed to output devices of the controlled system. One or more controller processors 206 or execution engines execute the control program 308 and control updating of data values in the data table 310 in accordance with measured data from the I/O modules 306 and execution of the control program 308.

In this illustrated example, the blockchain component 212 is embodied as a sub-system of controller 202, and is implemented using separate memory and processing resources from control components 304. For example, blockchain component 212 can utilize its own processor 322 and memory 324, which are separate from controller processor(s) 206 and memory 204. In this way, blockchain functions (e.g., transaction processing and validation, block generation, smart contract processing and enforcement, etc.) performed by the blockchain component 212 can be segregated from control-related analytics, and is not necessarily implemented using the primary control language of the controller 202. While components of the blockchain component 212 can read data from and write data to the controller's data table 310 (e.g., via a data bus 312) in connection with performing blockchain creation and management functions, the processing resources used to carry out these blockchain functions are physically separated from those used to carry out control. In this way, blockchain functions carried out by the blockchain component 212 do not impact performance of the controller's basic control functionality. As noted above, although FIG. 3 depicts the embedded blockchain component 212 as being a sub-system of an industrial controller, blockchain component 212 can also be embedded on other types of industrial devices, including but not limited to motor drives, industrial sensors, vision systems, safety relays, barcode stampers, or other such devices.

The blockchain component 212 can be utilized in virtually any type of data-generating industrial device, including but not limited to an industrial controller 202, a motor drive, an HMI terminal, a vision system, an industrial optical scanner, a meter, a telemetry device, an industrial safety device, a safety relay, a barcode stamper, an ERP server, an MES server, an industrial Internet of Things (IIoT) device, or other such device or system. The blockchain component 212 can comprise a proof engine component 314, a cryptographic component 316, a hashing component 318, an instruction execution component 320, one or more processors 322, and/or memory 324. In various embodiments, one or more of the proof engine component 314, cryptographic component 316, hashing component 318, instruction execution component 320, the one or more processors 322, and/or memory 324 can be electrically and/or communicatively coupled to one another to perform one or more of the functions of the blockchain component 212. In some embodiments, components 314, 316, 318, and/or 320, can comprise software instructions stored on memory 324 and executed by processor(s) 322.

Proof engine component 314 can be configured to validate industrial or supply chain transactions for inclusion in a new block of an industrial blockchain in accordance with a blockchain instruction. Cryptographic component 316 can be configured to encrypt and decrypt transaction data, recipe data, or other information exchanged with other blockchain-enabled industrial devices within a blockchain system or ecosystem. In some embodiments, cryptographic component 316 can leverage private keys and/or public keys in connection with encryption and decryption of blockchain information. Hashing component 318 can be configured to hash transaction data and generate Merkle trees in accordance with a blockchain instruction. Instruction execution component 320 can be configured to execute industrial blockchain instructions that create blocks representing transactions received or executed by the blockchain component 212, add the blocks to industrial blockchains, and/or update a blockchain ledger.

The one or more processors 322 can perform one or more of the functions described herein with reference to the systems and/or methods disclosed. Memory 324 can be a computer-readable storage medium storing computer-executable instructions and/or information for performing the functions described herein with reference to the systems and/or methods disclosed. As will be described in more detail below, processor(s) 322 and memory 324 may be segregated from the primary memory that performs the device's real-time control functions. It is noted that memory herein can be removable (e.g., a removable memory card, USB drive, etc.) For example, an industrial network may not comprise an open network for which a system herein can query a cloud network or server directly. Thus, such networks can comprise intranet networks exposed only to a plant floor, thus preventing exposure of the networks to the internet and reducing risks of ransomware or secure hacks. Removable memory devices can thus be utilized in controllers herein to read/write data for a token herein and/or smart contract query of an industrial blockchain.

Figure 4:
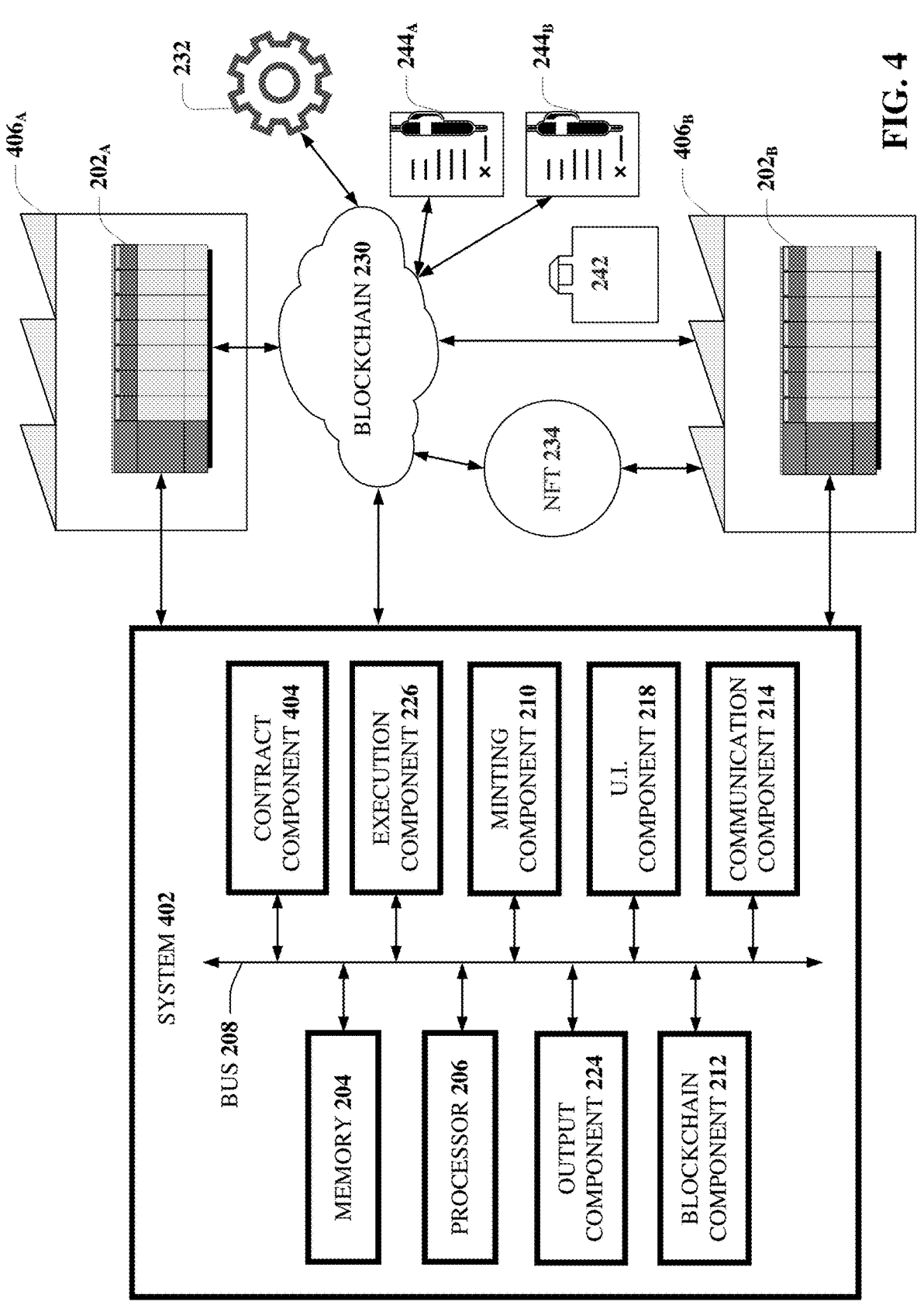
FIG. 4 is a block diagram of an exemplary system in accordance with one or more embodiments described herein.

FIG. 4 is a diagram of an example, non-limiting system 402 configured to, for instance, facilitate an action defined by a smart contract 244 in accordance with one or more embodiments herein. System 402 can comprise a computerized tool, which can be configured to perform various operations relating to industrial automation manufacturing with NFTs and smart contracts. The system 402 can comprise one or more of a variety of components, such as memory 204, processor 206, bus 208, minting component 210, blockchain component 212, communication component 214, U.I. component 218, output component 224, execution component 226, and/or contract component 404. In various embodiments, the system 402 can be communicatively coupled to, or can further comprise, controller(s) 202, blockchain ledger 230, blockchain oracle 232, NFT 234, and/or smart contract 244. In various embodiments, one or more of the memory 204, processor 206, bus 208, minting component 210, blockchain component 212, communication component 214, U.I. component 218, output component 224, execution component 226, contract component 404, controller(s) 202, blockchain ledger 230, blockchain oracle 232, NFT 234, and/or smart contract 244 can be communicatively or operably coupled (e.g., over a bus or wireless network) to one another to perform one or more functions of the system 402. In various embodiments, industrial automation equipment herein is controlled by an industrial automation controller 202. In this regard, output of the industrial automation equipment, (e.g., product 242 output) can be determined by the industrial automation controller 202 (e.g., controller 202$_A$ and/or controller 202$_B$).

According to an embodiment, the contract component 404 can determine whether a product 242, generated using industrial automation equipment (e.g., industrial device 120) (not depicted in FIG. 4), satisfies a defined condition of the smart contract 244 (e.g., smart contract 244$_A$). In various embodiments, such a condition can comprise a quantity of products 242 applicable to the smart contract 244, rate of production output from industrial automation equipment, measure of a raw material used in a product applicable to the smart contract 244, etc. The execution component 226 can then, in response to product 242 being determined to satisfy the defined condition, execute a defined term of the smart contract 244. Such a defined term can comprise facilitation of a payment associated with the product output, generation of an order comprising a raw material applicable to a product produced by the industrial automation equipment, generating a message comprising message data indicative of the product output and sending the message to a registered participant of the smart contract 244, or another suitable defined term. In one or more embodiments, the defined term can comprise an instruction to mint NFT 234 (e.g., associated with the product 242). Therefore, the minting component 210 can be caused (e.g., by the execution component 226) to mint the above-noted NFT 234. In another embodiment, the above defined term can comprise retrieving an electronic payment for the product 242 according to the smart contract 244. In some embodiments, the electronic payment can comprise a transfer of a cryptographic asset stored on a blockchain 230 from an entity or external device to the system 402 (e.g., via the communication component 214).

In various embodiments, a plurality of smart contracts 244 can be stored on the blockchain 230. In some instances, the plurality of smart contracts can be interdependent, or one smart contract can depend on another smart contract. In this regard, smart contract $244_A$ can comprise a first smart contract, and smart contract $244_B$ can comprise a second smart contract. Further in this regard, and in some embodiments, a defined term of smart contract $244_A$ can comprise executing smart contract $244_B$. According to an embodiment, the defined condition of the smart contract 244 can comprise a first defined condition. In this regard, the execution component 226 can execute the defined term of the smart contract 244 further in response to output of the industrial automation equipment being determined to satisfy a second defined condition of the smart contract 244. It is noted that, in some embodiments, a plurality of smart contracts can depend on a first smart contract.

It is noted that blockchain 230 can be representative of one or more blockchains, public and/or private. In this regard, see FIG. 8 as later discussed in greater detail, in which public and/or private industrial blockchains can be used to track manufactured products through a manufacturing facility or across multiple facilities of an industrial enterprise. For instance, the output component 224 can determine a first manufacturing output according to a first blockchain (e.g., private blockchain 806a) and a second manufacturing output according to a second blockchain (e.g., private blockchain 806b or 806d). The output component 224 can further aggregate the first manufacturing output and the second manufacturing output, thus resulting in an aggregated manufacturing output. The output component 224 can store the aggregated manufacturing output to a third blockchain (e.g., private blockchain 806c). In this regard, the private blockchain 806c can comprise an aggregated blockchain that stores aggregated manufacturing output. In various embodiments, the U.I. component 218 can render the aggregated manufacturing output via an interface of the industrial automation system 402 (e.g., HMI 114). In some embodiments, the first blockchain is associated with a first programmable logic controller (e.g., controller 202A), and the second blockchain is associated with a second programmable logic controller (e.g., controller 202B).

It is noted that one or more of the private blockchains 806 and/or public blockchains 808 can be associated with the smart contract 244. Thus, in response to a determination by the output component 224 that the aggregated manufacturing output satisfies a defined condition of the smart contract 244, the execution component 226 can execute a defined term of the smart contract 244. In some embodiments, the first blockchain (e.g., private blockchain 806a) can be associated with a first manufacturing facility $406_A$, and the second blockchain (e.g., private blockchain 806d) can be associated with a second manufacturing facility $406_B$. In further embodiments, the first blockchain (e.g., private blockchain 806a) is associated with a first assembly line of the first facility $406_A$, and the second blockchain (e.g., in this example, private blockchain 806b) can be associated with a second assembly line at the same facility $406_A$.

According to another embodiment, the output component 224 can determine whether a defined event associated with industrial automation equipment (e.g., industrial device 120) has occurred. Such a defined event can comprise a maintenance or service activity associated with the industrial automation equipment. In further embodiments, the defined event can comprise a compliance certification applicable to the industrial automation equipment. The blockchain component 212 can then, in response to the defined event being determined by the output component 224 to have occurred, store data representative of the occurrence of the defined event to the industrial blockchain 230. In some embodiments, the data representative of the occurrence of the defined event can comprise an NFT or using a fingerprint generated to be representative of the data representative of the occurrence of the defined event. In this regard, the minting component 210 can mint an NFT comprising the data representative of the occurrence of the defined event. As described above, it is noted that blockchain 230 can be representative of one or more blockchains, public and/or private. A private blockchain, such as private blockchain(s) 806, can be accessible only by authorized nodes registered with the private blockchain 806. Authorized nodes can comprise the system 402, controller(s) 202, or other suitable nodes. According to an embodiment, the blockchain component 212 can output the data representative of the occurrence of the defined event to an authorized blockchain oracle 232 associated with the industrial blockchain 230.

Figure 5:
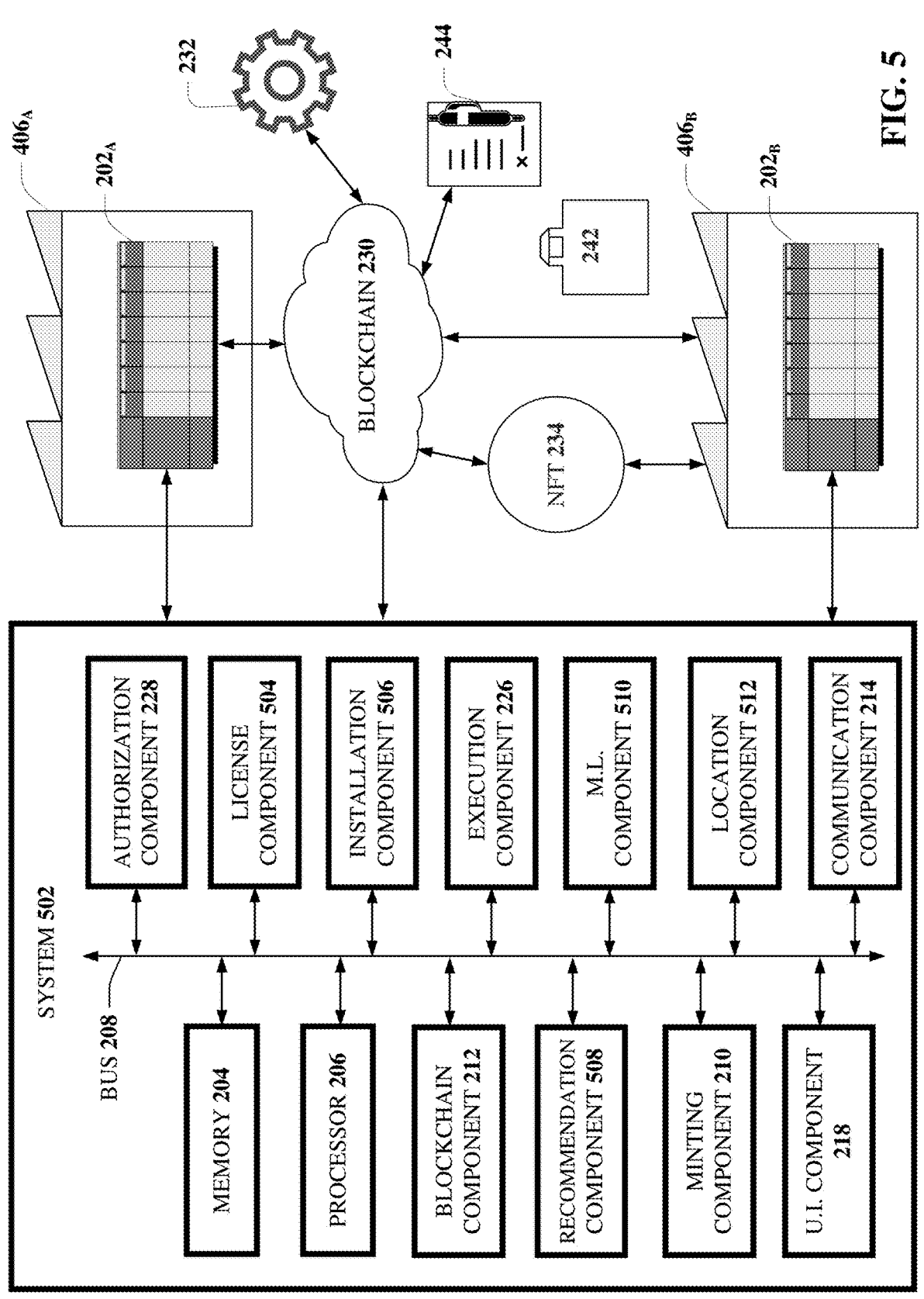
FIG. 5 is a block diagram of an exemplary system in accordance with one or more embodiments described herein.

FIG. 5 is a diagram of an example, non-limiting system 502 configured to, for instance, mint a non-fungible token comprising the license for industrial automation software in accordance with one or more embodiments herein. System 502 can comprise a computerized tool, which can be configured to perform various operations relating to tokenized industrial automation software. The system 502 can comprise one or more of a variety of components, such as memory 204, processor 206, bus 208, minting component 210, blockchain component 212, communication component 214, U.I. component 218, execution component 226, authorization component 228, license component 504, installation component 506, recommendation component 508, machine learning (M.L.) component 510, and/or location component 512. In various embodiments, the system 502 can be communicatively coupled to, or can further comprise, controller (s) 202, blockchain ledger 230, blockchain oracle 232, NFT 234, and/or smart contract 244. In various embodiments, one or more of the memory 204, processor 206, bus 208, minting component 210, blockchain component 212, communication component 214, U.I. component 218, output component 224, execution component 226, contract component 404, controller(s) 202, blockchain ledger 230, blockchain oracle 232, NFT 234, and/or smart contract 244 can be communicatively or operably coupled (e.g., over a bus or wireless network) to one another to perform one or more functions of the system 502.

According to an embodiment, the authorization component 228 can determine, according to a defined authorization criterion, authorization of a request for a license for industrial automation software (e.g., industrial automation software applicable to a controller 202, industrial device 120, or other suitable industrial automation equipment). In this regard, authorization of a request for a license can be representative of a request for a license for industrial automation software in response to a payment made for the license, an agreement to issue a license, in response to another suitable event. In various examples, the authorization criterion can be defined in terms of a permitted range of values for respective different device configuration parameters or hardware settings, permitted users or user roles that are permitted to access industrial automation software, identities of I/O modules or special function modules, or other suitable factors. The authorization criterion can additionally or alternatively comprise blockchain-based authentication of the request and/or receipt of electronic funds applicable to a license. The license component 504 can then, in response to the determination by the authorization component 228 that the request for the license is authorized, mint an NFT 234 comprising the license for the industrial automation software. Such NFTs can be stored on the industrial blockchain 230. Additionally, or alternatively, the license component 504 can reject issuance of the license in response to the determination, by the authorization component, that the request is not authorized (e.g., payment not received or requesting entity not recognized). It is noted that a group of industrial automation software, comprising the above described industrial automation software, can stored on an industrial blockchain 230 or on a centralized cloud server (e.g., cloud platform 122). The installation component 506 can initiate, upon receipt of the NFT 234, installation of the industrial automation software on a device represented in the request for the license.

In another embodiment, the blockchain component 212 and/or minting component 210 can store a bill of authorized components (e.g., similar to bill of materials 238) used in the manufacture of a product 242. The authorization component 228 can then determine whether the product 242 comprises an unauthorized component, other than those represented in the bill of authorized components. The execution component 226 can then, in response to a determination by the authorization component 228 that the product 242 comprises an unauthorized component, terminate a warranty for the product 242 tracked via the industrial blockchain 230. According to an embodiment, the minting component 210 can generate an NFT 234 that comprises a bill of authorized components. In this regard, the determination (e.g., by the authorization component 228) of whether the product 242 comprises the unauthorized component can be based on a comparison of the unauthorized component to the NFT 234.

In some embodiments, the recommendation component 508 can generate a defined recommendation to repair the product 242 to bring the product 242 into warranty compliance. To determine the recommendation, the recommendation component 508 can utilize a recommendation model generated using machine learning (e.g., via the M.L. component 510) (e.g., applied to past recommendation other than the instant recommendation). In this regard, the M.L. component 510 can analyze past recommendations for repairs (e.g., successful repairs and/or unsuccessful repairs) to products in order to generate the recommendation model. This recommendation model can then be employed by the recommendation component 508 in this instance, and in future instances, to generate recommendations to bring the product 242 into warranty compliance. The recommendation model can also be updated over time based on accuracy of the recommendation model as determined using changes made by the system 502 in reliance on the recommendation model. In some embodiments, defined recommended repairs herein can comprise authorized replacement of the unauthorized component with an authorized component. Such authorized components can comprise software and/or hardware components of the product 242.

According to another embodiment, the location component 512 can store, to the blockchain 230, a first geolocation for which a product 242 generated using industrial automation equipment is authorized for use. The location component 512 can further determine a second geolocation of the product 242 (e.g., a current location) and determine whether the first geolocation matches the second geolocation. If the location component 512 determines that the first geolocation does not match the second geolocation, the blockchain component 212 can store data indicative of unauthorized use of the product 242. In some embodiments, the U.I. component 218 can render, via a user interface, an alert comprising the data indicative of the unauthorized use of the product 242. In some embodiments, a licensed contract to use the product 242 can also be embedded (e.g., as a smart contract enforced by the system 502) to prevent use of the product 242 outside of a defined location. Geotagging can be used to verify that the product 242 is being executed at an agreed location (e.g., at a specified plant facility or end use location). In such embodiments, the product 242 can be made aware of its location based on geotagging functionality of the product 242, and will only allow execution by the product 242 if the geotagged location corresponds to the agreed location.

In some embodiments, if the location component 512 determines that the first geolocation does not match the second geolocation, the execution component 226 can terminate a warranty for the product 242 and/or a feature of the product 242. Systems that support aggregation of component part blockchains into aggregate blockchains associated with a sub-assembly or final assembled product, as described above, can also leverage these aggregate assembly blockchains in connection with warranties herein. For example, a manufacturing entity that produces and ships a sub-assembly or assembled product can store, as immutable composite blockchains, assembly information identifying the various component parts that were used in the assembled product. This assembly information can include some or all of the provenance and/or part characteristic data described above. Similarly, authorized geolocations (e.g., regions, geofences, countries, states, localities, etc.) in which a product can be used can be stored to the blockchain 230. This composite assembly and/or geolocation information can subsequently be checked to determine whether an assembled product that has been returned for repairs or replacement under warranty has been altered or tampered with by the customer or end user, or whether the product is or was used outside of an authorized geolocation. In the case of assembled products comprising RFID-tagged parts, this determination can be made by reading RFID data from the component parts that make up the returned product to determine the as-returned composition of the product, and comparing this as-returned composition with the as-built composition recorded in the assembled product's blockchain. An RFID tag reader interfaced to one or more sources of the plant's blockchain data can be configured to make this comparison and to output information identifying anomalous parts or part replacements present in the as-returned composition. Depending on the terms of the warranty, the manufacturing entity may choose to either deny or proceed with the repair or replacement. For example, the warranty may dictate replacement of one or more specified component parts by the end user is permitted and does not violate the terms of the warranty. If the system determines that only such component parts have been replaced, the replacement or repair may be permitted. Alternatively, if the system determines that a component part replaced by the end user violates the terms of the warranty, the replacement or repair may be denied.

Various embodiments described herein can employ artificial-intelligence or machine learning systems and techniques to facilitate learning user behavior, context-based scenarios, preferences, etc. in order to facilitate taking automated action with high degrees of confidence. Utility-based analysis can be utilized to factor benefit of taking an action against cost of taking an incorrect action. Probabilistic or statistical-based analyses can be employed in connection with the foregoing and/or the following.

Systems and/or associated controllers, servers, or machine learning components described herein can comprise artificial intelligence component(s) which can employ an artificial intelligence (A.I.) model and/or M.L. or an M.L. model that can learn to perform the above or below described functions (e.g., via training using historical training data and/or feedback data).

In some embodiments, M.L. component 510 can comprise an A.I. and/or M.L. model that can be trained (e.g., via supervised and/or unsupervised techniques) to perform the above or below-described functions using historical training data comprising various context conditions that correspond to various augmented network optimization operations. In this example, such an A.I. and/or M.L. model can further learn (e.g., via supervised and/or unsupervised techniques) to perform the above or below-described functions using training data comprising feedback data, where such feedback data can be collected and/or stored (e.g., in memory) by the M.L. component 510. In this example, such feedback data can comprise the various instructions described above/below that can be input, for instance, to a system herein, over time in response to observed/stored context-based information.

A.I./M.L. components herein can initiate an operation(s) associated with a based on a defined level of confidence determined using information (e.g., feedback data). For example, based on learning to perform such functions described above using feedback data, performance information, and/or past performance information herein, an M.L. component 510 herein can initiate an operation associated with determining various thresholds herein (e.g., a motion pattern thresholds, input pattern thresholds, similarity thresholds, authentication signal thresholds, audio frequency thresholds, or other suitable thresholds).

In an embodiment, the M.L. component 510 can perform a utility-based analysis that factors cost of initiating the above-described operations versus benefit. In this embodiment, the M.L. component 510 can use one or more additional context conditions to determine various thresholds herein.

To facilitate the above-described functions, a M.L. component 510 herein can perform classifications, correlations, inferences, and/or expressions associated with principles of artificial intelligence. For instance, the M.L. component 510 can employ an automatic classification system and/or an automatic classification. In one example, the M.L. component 510 can employ a probabilistic and/or statistical-based analysis (e.g., factoring into the analysis utilities and costs) to learn and/or generate inferences. The M.L. component 510 can employ any suitable machine-learning based techniques, statistical-based techniques and/or probabilistic-based techniques. For example, the M.L. component 510 can employ expert systems, fuzzy logic, support vector machines (SVMs), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, and/or the like. In another example, the M.L. component 510 can perform a set of machine-learning computations. For instance, the M.L. component 510 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

Figure 6:
FIG. 6 is a diagram of an example industrial blockchain network architecture in accordance with one or more embodiments described herein.

FIG. 6 is a diagram of an example industrial blockchain network architecture. In this example implementation, an industrial blockchain ecosystem 602 can comprise multiple participating blockchain systems 604. One or more of the participating blockchain systems 604 can be industrial systems comprising multiple blockchain-enabled industrial devices 606 (e.g., blockchain-enabled controllers, HMI terminals, gateway devices, MES systems, motor drives, meters or other telemetry devices, sensors, ERP systems, data historians IIoT devices, etc.). The industrial blockchain ecosystem 602 can span multiple geographic, organizational, and business boundaries. The blockchain systems 604 can be owned by, or may represent, entities representing different disciplines within the manufacturing, supply, distribution, and/or retail chain, including but not limited to engineering and product development, product manufacturing, product testing, shipping, technical support, business and accounting, etc. Systems 604 may be associated with producers and manufacturers, suppliers, sub-system suppliers (e.g., OEMs), designers and engineers, retailers, shippers, customers, end consumers, or other such entities. It is noted that NFTs minted or stored in one blockchain system 604 can be accessible or viewable by other blockchain systems in the blockchain ecosystem 602.

In some embodiments, blockchain-enabled industrial devices herein can be added to this infrastructure in a substantially plug-and-play manner. For example, upon power-up, a blockchain-enabled industrial device can broadcast its identity as a blockchain-enabled device to other devices on the blockchain network, and can also detect other blockchain-enabled devices. Devices across all layers of a plant (control, middleware, enterprise, etc.) can share their identities, born-on certificates, firmware versions, and other such information with other peer devices on the blockchain system 604 (and by extension the larger blockchain ecosystem 602). These devices can be preconfigured to cooperate with other blockchain-enabled industrial devices as a consortium within the blockchain system 604 to authenticate transactions using respective NFTs and/or consensus mechanisms (e.g., practical byzantine fault tolerance, proof-of-work, proof-of-state, etc.)

Since manufacturing and distribution chains can comprise multiple different entities having complex business interrelationships, each entity may wish to regulate access to the information (e.g., stored via NFTs) shared with other entities within the chain. For example, a supplier entity that manufactures and provides parts used by another manufacturing entity for manufacture of its own products may wish to provide only a limited subset of its available blockchain data relating to manufacture of the part (e.g., results of quality tests, manufacturing time stamps, a source of materials used to manufacture the part, etc.), while withholding other proprietary manufacturing statistics generated during production of the part and recorded in a blockchain. Accordingly, blockchain-enabled industrial devices herein can be configured to generate multiple versions of a blockchain with different degrees of access permissions.

Figure 7:
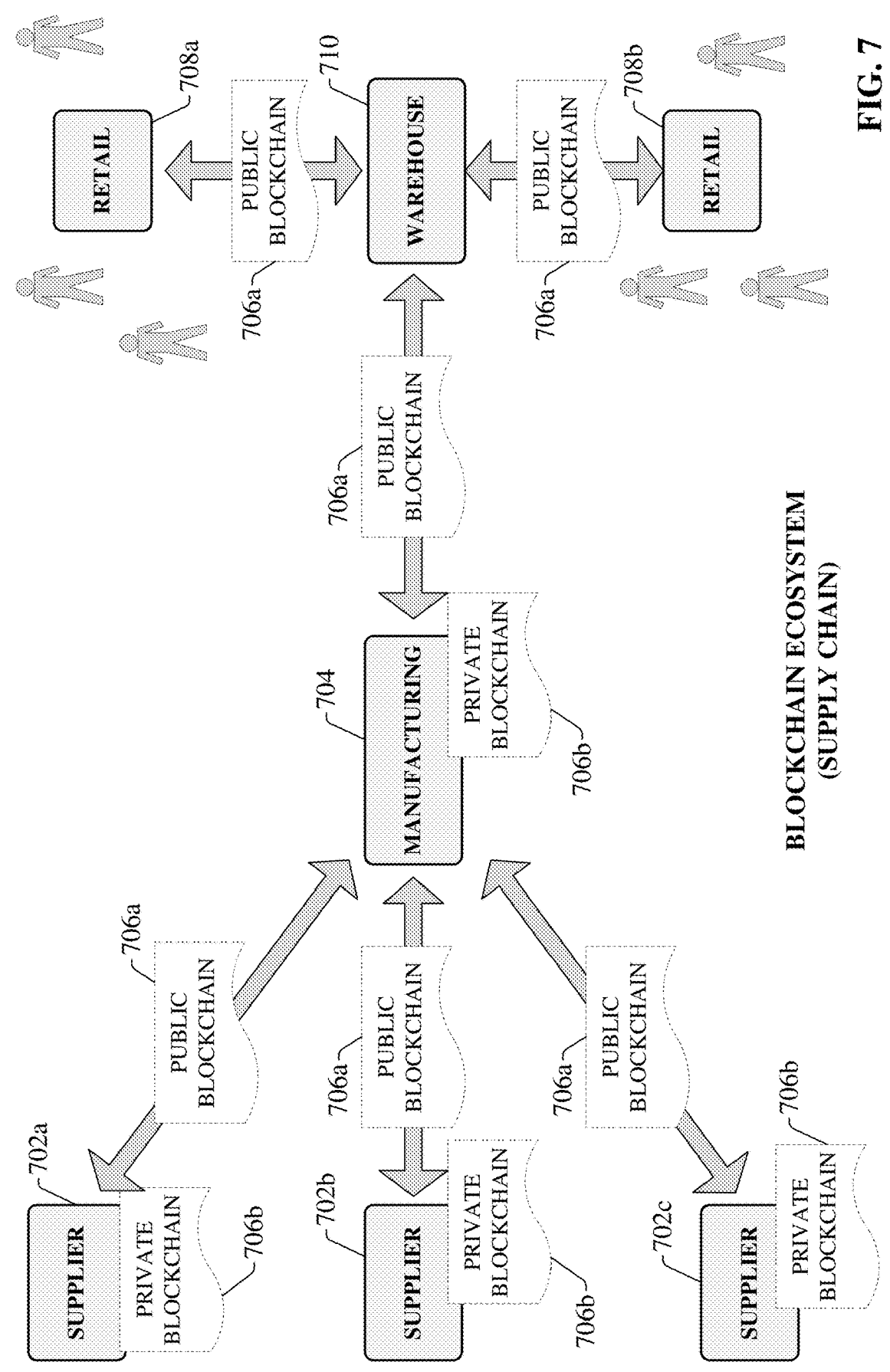
FIG. 7 is a diagram illustrating segregation of private and public NFT and/or blockchain information in an example industrial blockchain ecosystem in accordance with one or more embodiments described herein.

FIG. 7 is a diagram illustrating segregation of private and public NFT and/or blockchain information in an example industrial blockchain ecosystem. The example ecosystem depicted in FIG. 7 comprises a number of blockchain systems associated with respective entities that participate in a manufacturing and distribution chain, including supplier entities 702, a manufacturing entity 704, a warehouse entity 710, and retail entities 708. Supplier entities 702 may be manufacturing entities that provide parts or materials to manufacturing entity 704 that manufactures a product using the provided parts or materials. One or more supplier entities 702 may be OEMs that provide custom-built machines to the manufacturing entity 704. Manufacturing entity 704 may provide finished products to a warehouse 710, which may be owned by the same industrial enterprise that owns the manufacturing entity 704. Warehouse 710 may distribute product to retail entities 708. It is to be appreciated that the example industrial ecosystem depicted in FIG. 7 is only intended to be exemplary, and that an industrial blockchain ecosystem can comprise any collection of entities of various roles. It is noted that any each stage in the industrial blockchain ecosystem represented in FIG. 7, NFTs can be minted by the supplier entities 702, manufacturing entity 704, warehouse entity 710, and/or retail entities 708 such that data captured in each manufacturing stage can be captured and stored in a public and/or private blockchain.

One or more of the blockchain systems that make up the ecosystem can maintain both private blockchains 706b for internal use as well as public blockchains 706a accessible to other participating entities in the blockchain ecosystem. Public and private industrial blockchains can be used within a blockchain ecosystem comprising several business entities of a supply chain for a variety of applications, including but not limited to tracking of machine performance and usage, tracking of products across a manufacturing facility or within a single industrial enterprise, tracking of products across the larger supply and distribution chain, distribution of proprietary recipe information, and product auditing. These example industrial blockchain applications are discussed in more detail below.

Blockchain-enabled industrial devices that support generation of public and private industrial blockchains can be used to track performance and usage of machines sold by OEMs to their customer manufacturing entities. In an example scenario, multiple machines built by different OEMs (e.g., one or more supplier entities 702) can be deployed to an end user manufacturing site (manufacturing entity 704). According to a vertical-specific example, manufacturing entity 704 may be a beverage factory that runs a bottling line comprising fillers, sealers, conveyors, cartoners, and other machines. Some of the machines that make up the bottling line may be built and provided by one or more OEMs. During the machine build, blockchain-enabled industrial devices herein at the OEMs can generate private blockchains 706b that record transactions and associated data associated with the machine building process (e.g., via NFTs) that are to be accessible only by authorized devices and personnel associated with the OEM. The OEM's blockchain-enabled industrial devices can also be configured to generate public blockchains 706a that record publicly shared transaction data (e.g., via respective NFTs) that can be accessed and viewed by other devices that participate in the blockchain ecosystem, including devices associated with the customer manufacturing entity 704. This publicly accessible information can include, for example, results of factory acceptance tests (FATs) performed on the machine prior to shipping to the customer. Blockchain-enabled industrial devices that make up the machine, as well as blockchain-enabled test equipment used by the OEM, can capture these FAT results as transactions and record the results as validated blocks in the machine's public blockchain, which is shared with blockchain node devices at the manufacturing facility.

In a related aspect, NFTs generated for the machine (by the blockchain-enabled devices that make up the machine as well as by other peripheral systems such as ERP and MES systems) can be leveraged to perform machine warranty and maintenance tracking. For example, NFTs herein can be minted in response to one or more various events being determined to have occurred, and can capture usage and repair information for industrial automation equipment herein. This information can include, for example, dates and times at which a maintenance operation was performed, identities of any components or devices that were replaced or reprogrammed, dates and times of lock out/tag out procedures that were followed in connection with a maintenance action, identities of the personnel who performed the maintenance action, etc. The NFT that records this maintenance information can be maintained on a blockchain via distributed devices within the manufacturing entity's plant intranet, such that any single device on the plant's blockchain network can query the blockchain to obtain maintenance log information for the machine. This creates a tamper-proof record of maintenance operations that can be accessed without the need to log into a data historian. Some of this maintenance and operational information can be maintained on a private blockchain that is only accessible by devices on the plant's own intranet. Additionally, blockchain-enabled devices within the plant can generate a public version of the machine's blockchain that includes warranty-related information that is accessible by outside support entities (e.g., OEMs or other technical support entities) who have a business interest in the information. Information in this public version of the blockchain can include, for example, operating hours, power cycles, identities of devices added to the machine (which may be unauthorized devices), etc. This public version of the machine's blockchain can be viewed by outside support entities to validate claims made by the machine owner regarding internal maintenance actions performed on the machine or the machine's operational history.

The techniques described above regarding the use of industrial blockchains to track an OEM-provided machine or a product across its lifecycle can also be applied to parts, sub-assemblies, or materials provided by supplier entities 702 to a manufacturing entity 704. For example, the blockchain systems that make up an example industrial blockchain ecosystem may be geographically distributed across multiple businesses that together form an integrated supply chain for a product. In an automotive example, sub-assemblies for a car produced by an automotive facility (the manufacturing entity 704 in this example) may be manufactured by respective sub-assembly suppliers (supplier entities 702). In addition to generating private blockchains 706b that record proprietary manufacturing data generated in connection with the fabrication of the sub-assemblies, blockchain-enabled industrial devices at the supplier entities 702 can generate public blockchains 706*a* that record information regarding manufacture of the sub-assemblies permitted to be shared with the manufacturing entity 704. These public blockchains 706*a* are accessible by devices at the manufacturing entity 704, and only comprise a subset of available sub-assembly manufacturing information that the supplier is contractually obligated to provide to the manufacturer. This public blockchain information can be incorporated into the manufacturer's own information tracking for the fully assembled and sold vehicles.

Figure 8:
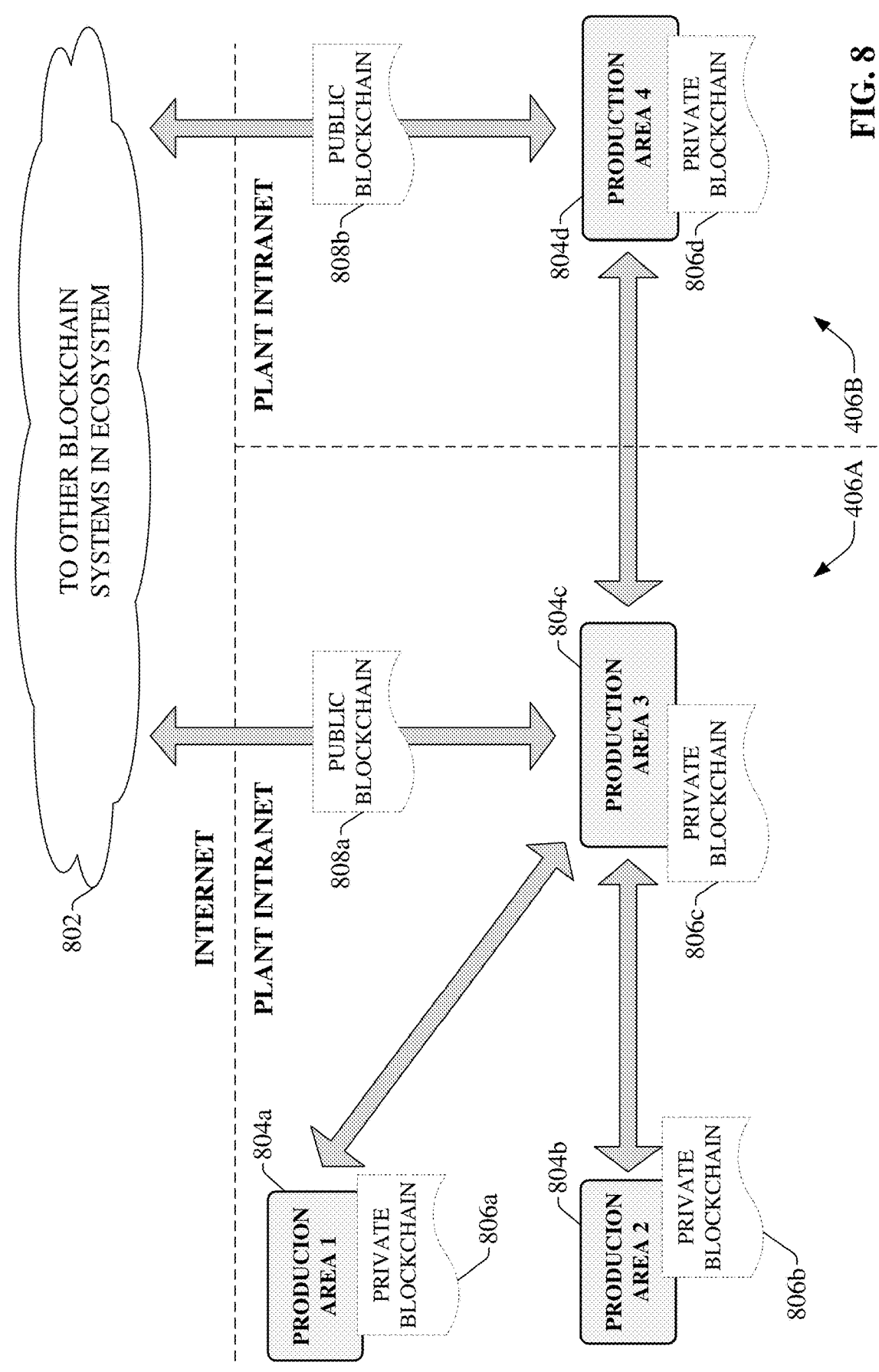
FIG. 8 is a diagram illustrating generation of blockchain data within a plant intranet in accordance with one or more embodiments described herein.

Public and/or private industrial blockchains can also be used to track manufactured products through a manufacturing facility or across multiple facilities of an industrial enterprise. FIG. 8 is a diagram illustrating generation of blockchain data within a plant intranet. The manufacturing facility depicted in FIG. 8 may correspond, for example, to manufacturing facility 406*A*, 406*B*, a combination of 406*A* and 406*B*, or one of the supplier entities 702 depicted in the supply chain ecosystem of FIG. 7. In FIG. 8, a number of production areas 804 within a manufacturing facility— including Production Area 1 and Production Area 2—produce component parts or materials that are provided to Production Area 3, which assembles the parts or materials received from those upstream production areas. During runtime, blockchain-enabled industrial devices herein (e.g., controller 202, system 402, system 502, industrial automation equipment, etc.) that operate within Production Areas 1 and 2 (the supplier production areas) bundle transactions generated within their respective production areas in connection with production of the component parts or materials, generate and validate NFTs representative of these transactions (e.g., collaboratively with other blockchain-enabled industrial devices within the respective production areas using consensus-based validation techniques such as practical byzantine fault tolerance, proof-of-work, or proof-of-state), and add the validated NFTs or blocks to a private blockchains 806 (e.g., 806*a*, 806*b*, 806*c*, 806*d*) that are only accessible to participating devices on the plant's intranet (and not to other entities of the larger blockchain ecosystem).

Component parts or materials produced by Production Areas 1 and 2 are conveyed to Production Area 3 for assembly into either a finalized product or a sub-assembly of the final product. The blockchain-enabled industrial controller 202 or system herein that controls the industrial assets in Production Area 3 can link, via a blockchain, the NFTs generated by controllers, devices, or equipment in Production Areas 1 and 2, which are associated with the respective component parts generated in those production areas. The devices of Production Area 3 can also expand this composite blockchain by associated NFTs and/or adding records of its own operations performed on the assembled product (e.g., via generation of further NFTs).

In some implementation, each assembled product can be represented by a unique NFT 234 minted for that respective product, with each NFTs transaction data comprising production statistics for the product 242. Example statistics that can be archived in the NFT can include, but are not limited to, a birth certificate (e.g., a serial number associated with the product 242), a bill of materials 238 for the product 242 (e.g., a list of components or raw materials in the product 242), a part identifier (e.g., a VIN number of an assembled vehicle, a serial number of a capped and labeled bottle, etc.), a timestamp indicating a time of assembly or manufacture, measured quality metrics (e.g., leak test results, cap or bolt torque data, etc.), machine states or telemetric data at the time the product was assembled (e.g., oven temperatures, moisture levels, water or air pressures, etc.), or other such information that can be married to a unit or batch of product. In some implementations, each operation performed on the unit of product during its progress through the production process can be represented in the unique NFT 234 associated with the respective instance of the product 242.

The technique for linking NFTs via industrial blockchains associated with component parts of a final assembled product can be extended to include parts, sub-assemblies, or materials received from outside supplier entities, and more generally to traversal of products across the entire supply chain (e.g., the supply chain depicted in FIG. 7). In such scenarios, supplier-provided components (e.g., batches of material, sub-assemblies, component parts, etc.) can be received at the manufacturing facility together with blockchains that record transactions associated with production of the components at the supplier sites and/or mint NFTs that capture events associated with a unique instance of a product 242. One or more blockchain-enabled industrial devices herein at the manufacturing facility can link these NFTs via an industrial blockchain herein, thus yielding a plurality of related NFTs generated during the production cycle of a unique product as the components of the product are assembled and/or processed. When the product leaves the manufacturing facility and arrives at the next entity in the supply chain (e.g., another manufacturing entity, a warehouse entity, a shipping entity, a retailer, etc.), any new transactions performed on the product at the next entity can be captured in an NFT and added to an existing blockchain associated with the product (including synchronized blockchain data associated with any of the product's sub-assemblies or component parts). In addition to manufacturing transactions, the industrial blockchain associated with the unit or instance of the product can also record product handling and location tracking information (e.g., warehouse shipping information) (e.g., captured via an NFT) as well as business-related information (e.g., order information, purchase information, authorized geolocation information, etc.). All of these diverse transactions are validated by a consortium of devices within the industrial blockchain system or ecosystem using suitable consensus-based validation techniques.

Figure 9:
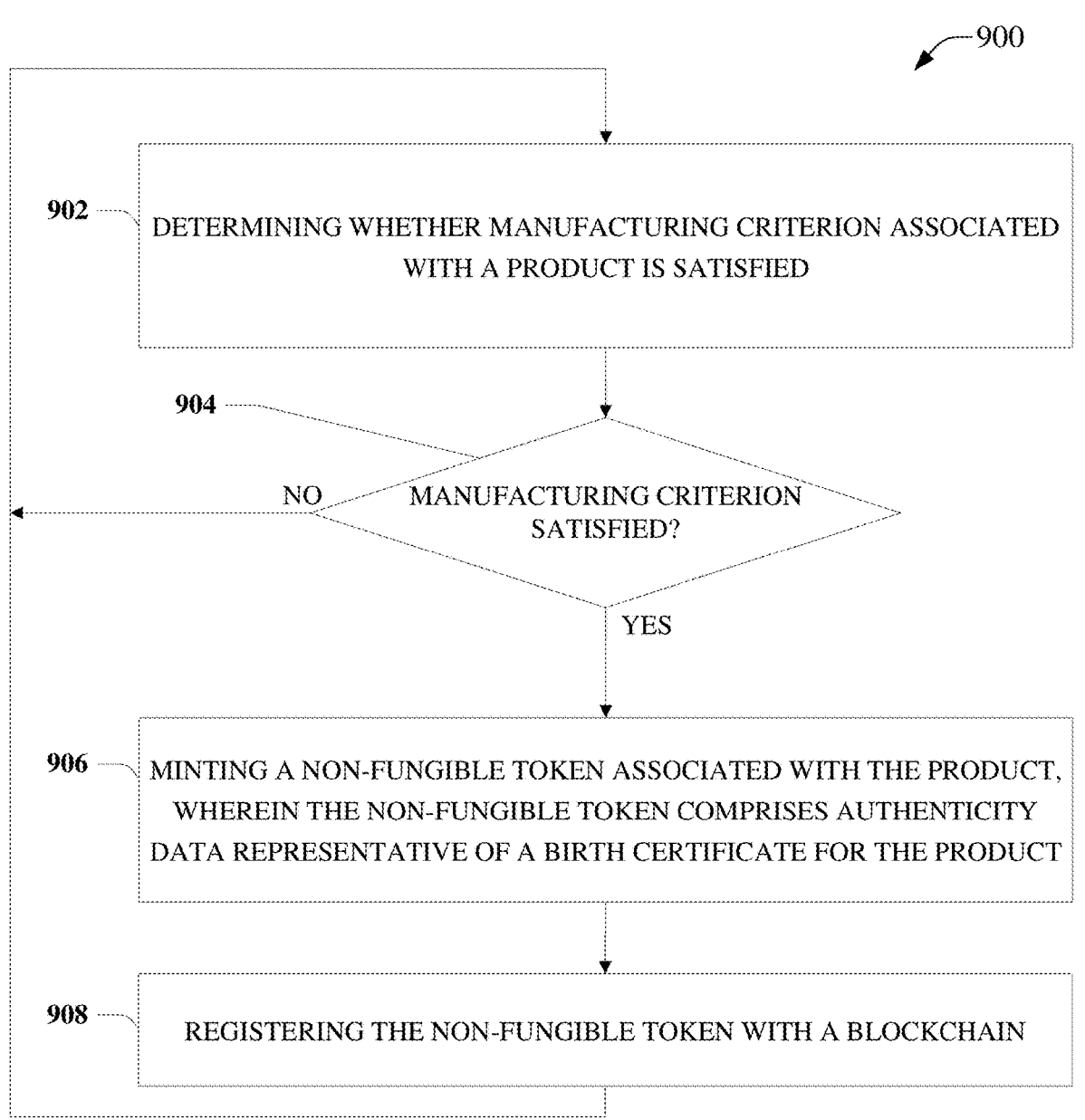
FIG. 9 is a block flow diagram of a process associated with industrial blockchain enabled automation control in accordance with one or more embodiments described herein.

FIG. 9 is a block flow diagram of a process 900 for industrial blockchain enabled automation control in accordance with one or more embodiments described herein. At 902, the minting component 210 can determine whether a manufacturing criterion associated with a product 242 is satisfied. Such a manufacturing criterion can comprise any suitable manufacturing criterion, such as a completion of a step or set of steps in the manufacturing of the product 242, a defined quantity of products 242 being produced, a defined amount of time elapsing, or another suitable manufacturing criterion. At 904, if the manufacturing criterion is not satisfied (N at 904), the process can return to 902. If at 904, the manufacturing criterion is satisfied (Y at 904), the process can proceed to 906. At 906, the minting component 210 can mint an NFT 234 associated with the product 242. The NFT 234 (e.g., an instance of the NFT 234) can comprise a unique identifier, uniquely associated with the product 242 (e.g., a unique instance of the product 242). In one or more embodiments, the NFT 234 can comprise authenticity data representative of a birth certificate 236 for the product 242. Such a birth certificate 236 can comprise a serial number associated with the product 242, a bill of materials 238 for the product 242 (e.g., a list of components or raw materials in the product 242), or other suitable information regarding the product 242. At 908, the block-chain component 212 can register the NFT with the block-chain 230 (e.g., on a respective public and/or private block-chain).

Figure 10:
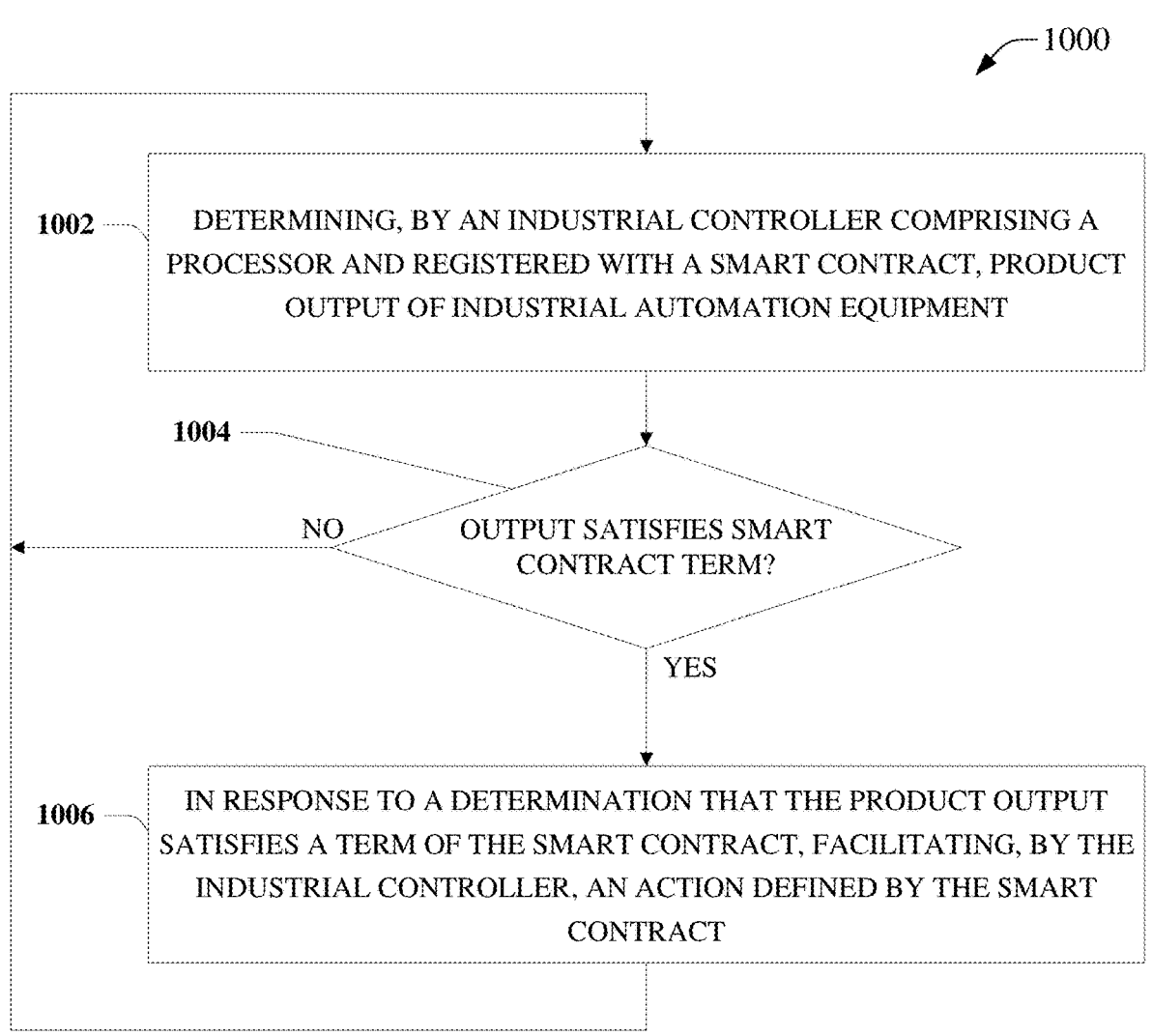
FIG. 10 is a block flow diagram of a process associated with industrial blockchain enabled automation control in accordance with one or more embodiments described herein.

FIG. 10 is a block flow diagram of a process 1000 for industrial blockchain enabled automation control in accordance with one or more embodiments described herein. At 1002, the controller 202 can (e.g., via the output component 224) determine product output of industrial automation equipment herein (e.g., a quantity of products 242 applicable to smart contract 244, rate of production output, measure of a raw material used in a product applicable to the smart contract 244, etc.) At 1004, if the product output does not satisfy a term of the smart contract (N at 1004), the process can return to 1002. If at 1004, the product out satisfies a term of the smart contract (Y at 1004), the process can proceed to 1006. At 1006, in response to a determination by the output component 224 that the above product output satisfies a term of a smart contract 244, the execution component 226 can facilitate an action defined by the smart contract 244. Such an action can comprise facilitation of a payment associated with the product output, generation of an order comprising a raw material applicable to a product produced by the industrial automation equipment, generating a message comprising message data indicative of the product output and sending the message to a registered participant of the smart contract 244, or another suitable action.

Figure 11:
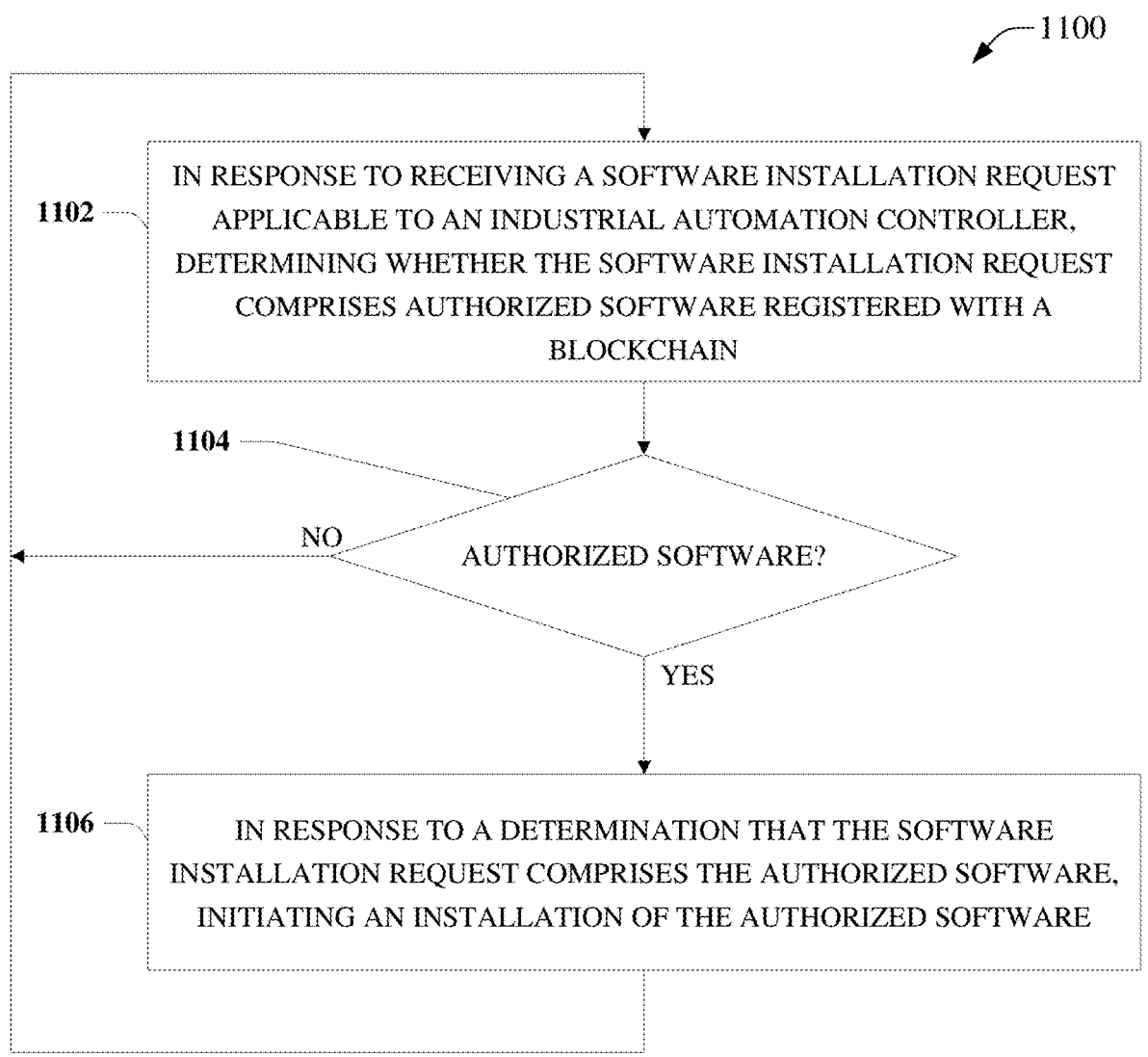
FIG. 11 is a block flow diagram of a process associated with industrial blockchain enabled automation control in accordance with one or more embodiments described herein.

FIG. 11 is a block flow diagram of a process 1100 for industrial blockchain enabled automation control in accordance with one or more embodiments described herein. At 1102, the authorization component 228 can determine whether a software installation request (e.g., received via the communication component 214) comprises authorized software, registered with the blockchain 230. To determine various authorizations herein, such as those resulting from valid software requests, the authorization component 228 can be configured to identify authorized software stored on the blockchain 230 based on, for instance, a defined authorization criterion. To this end, some embodiments of the blockchain component 212 can store data representative of the authorized software to the blockchain ledger 230. Data representative of the authorized software can be associated with a corresponding NFT, such as NFT 234, stored to the blockchain ledger 230. At 1104, if the software installation request is not for authorized software (N at 1104), the process can return to 1102. If at 1104, the software request is for authorized software (Y at 1104), the process can proceed to 1106. At 1106, in response to a determination via the authorization component 228 that the above-noted software request comprises authorized software, the execution component 226 can initiate an installation of the authorized software (e.g., based on the request). The installation can be performed according to the request on a device associated with the request (e.g., a controller, industrial automation equipment, or system herein).

Figure 12:
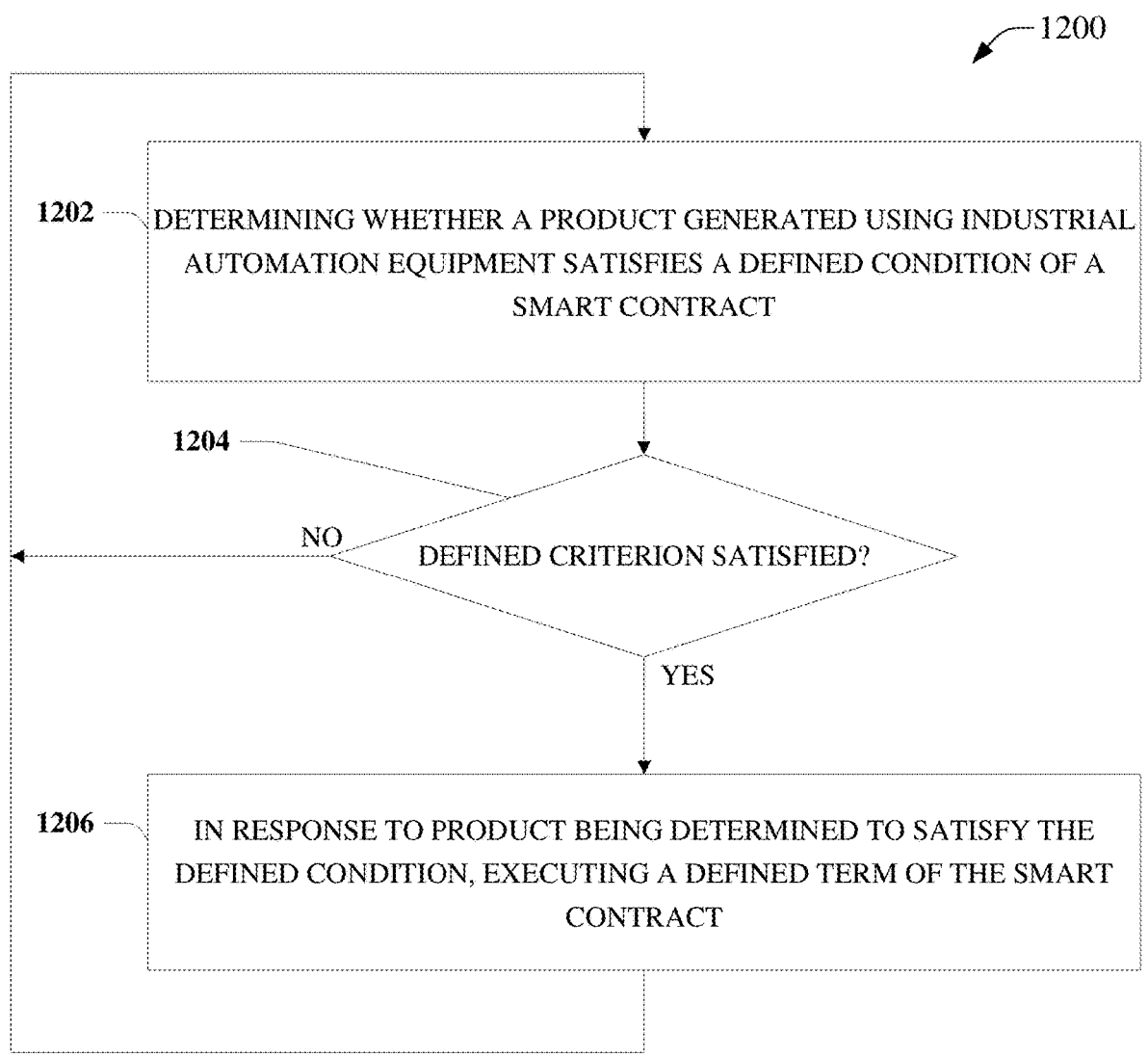
FIG. 12 is a block flow diagram of a process associated with industrial automation manufacturing with NFTs and smart contracts in accordance with one or more embodiments described herein.

FIG. 12 is a block flow diagram of a process 1200 for industrial automation manufacturing with NFTs and smart contracts in accordance with one or more embodiments described herein. At 1202, the contract component 404 can determine whether a product 242, generated using industrial automation equipment (e.g., industrial device 120), satisfies a defined condition of a smart contract 244. In various embodiments, such a condition can comprise a quantity of products 242 applicable to the smart contract 244, rate of production output from industrial automation equipment, measure of a raw material used in a product applicable to the smart contract 244, etc. At 1204, if the defined criterion is not satisfied (N at 1204), the process can return to 1202. If at 1204, the defined criterion is satisfied (Y at 1204), the process can proceed to 1206. At 1206, the execution component 226 can, in response to product 242 being determined to satisfy the defined condition, execute a defined term of the smart contract 244. Such a defined term can comprise facilitation of a payment associated with the product output, generation of an order comprising a raw material applicable to a product produced by the industrial automation equipment, generating a message comprising message data indicative of the product output and sending the message to a registered participant of the smart contract 244, or another suitable defined term.

FIG. 13 is a block flow diagram of a process 1300 for industrial automation manufacturing with NFTs and smart contracts in accordance with one or more embodiments described herein. At 1302, the output component 224 can determine a first manufacturing output according to a first blockchain (e.g., private blockchain 806a) and a second manufacturing output according to a second blockchain (e.g., private blockchain 806b or 806d). At 1304, the output component 224 can aggregate the first manufacturing output and the second manufacturing output, thus resulting in an aggregated manufacturing output. At 1306, the U.I. component 218 can render the aggregated manufacturing output via an interface of the industrial automation system 402 (e.g., HMI 114).

Figure 14:
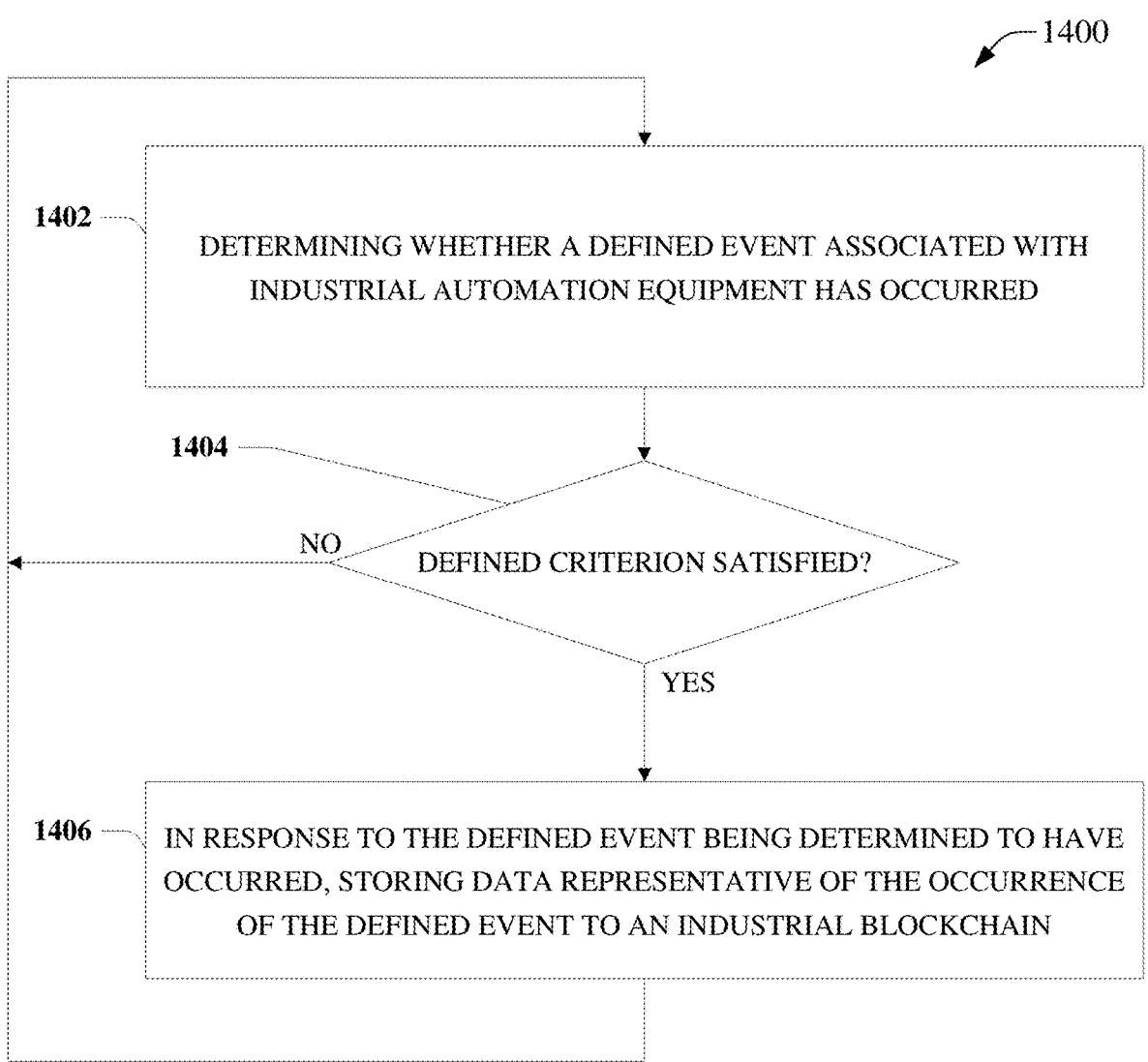
FIG. 14 is a block flow diagram of a process associated with industrial automation manufacturing with NFTs and smart contracts in accordance with one or more embodiments described herein.

FIG. 14 is a block flow diagram of a process 1400 for industrial automation manufacturing with NFTs and smart contracts in accordance with one or more embodiments described herein. At 1402, the output component 224 can determine whether a defined event associated with industrial automation equipment (e.g., industrial device 120) has occurred. Such a defined event can comprise a maintenance or service activity associated with the industrial automation equipment. In further embodiments, the defined event can comprise a compliance certification applicable to the industrial automation equipment. At 1404, if the defined criterion is not satisfied (N at 1404), the process 1400 can return to 1402. If at 1404, the defined criterion is satisfied (Y at 1404), the process 1400 can proceed to 1406. At 1406, the block-chain component 212 can then, in response to the defined event being determined by the output component 224 to have occurred, store data representative of the occurrence of the defined event to the industrial blockchain 230. In some embodiments, the data representative of the occurrence of the defined event can comprise an NFT or using a fingerprint generated to be representative of the data representative of the occurrence of the defined event. In this regard, the minting component 210 can mint an NFT comprising the data representative of the occurrence of the defined event.

Figure 15:
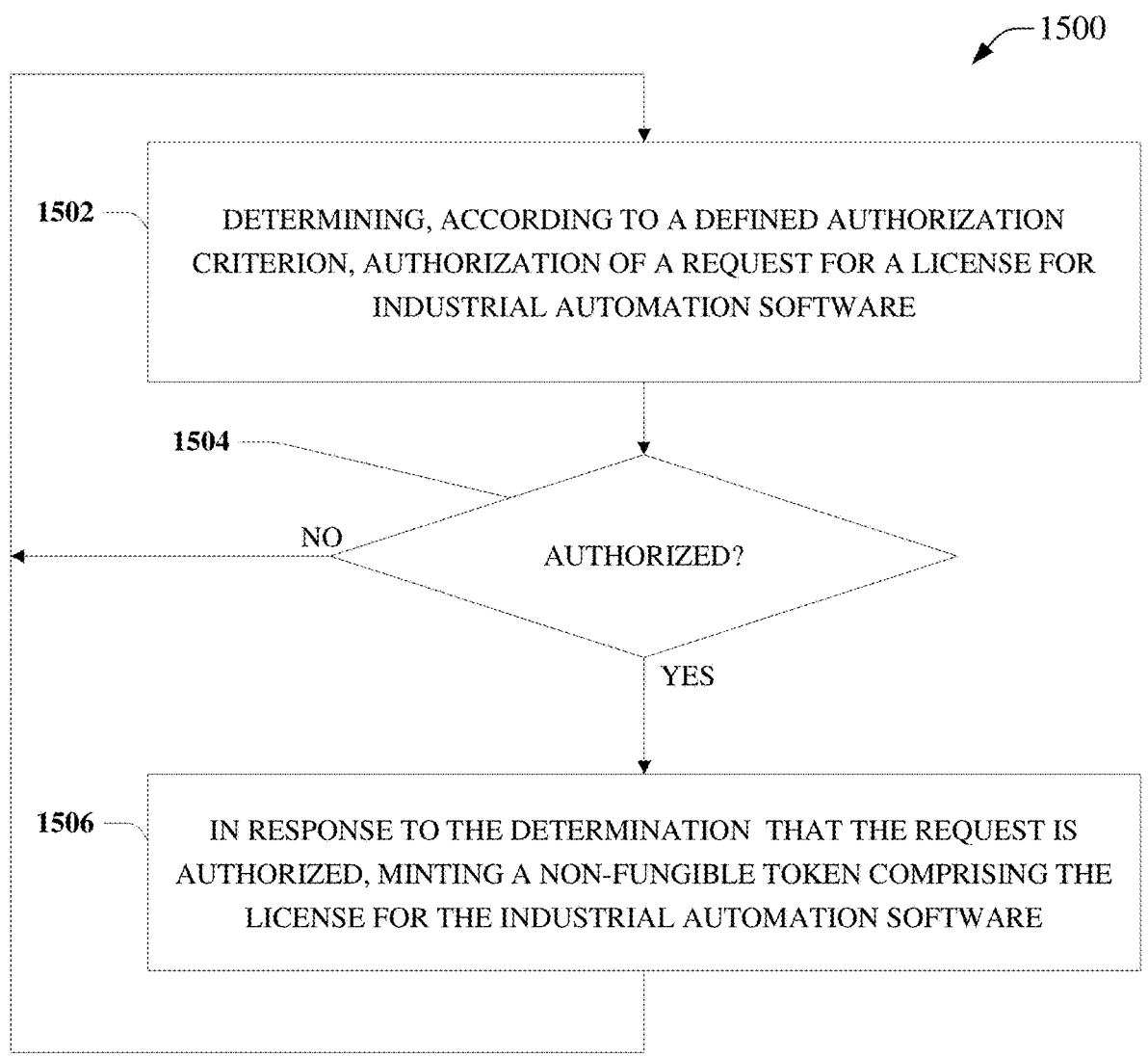
FIG. 15 is a block flow diagram of a process associated with tokenized industrial automation software in accordance with one or more embodiments described herein.

FIG. 15 is a block flow diagram of a process 1500 for tokenized industrial automation software in accordance with one or more embodiments described herein. At 1502, the authorization component 228 can determine, according to a defined authorization criterion, authorization of a request for a license for industrial automation software (e.g., industrial automation software applicable to a controller 202, industrial device 120, or other suitable industrial automation equipment). In various examples, the authorization criterion can be defined in terms of a permitted range of values for respective different device configuration parameters or hardware settings, permitted users or user roles that are permitted to access industrial automation software, identities of I/O modules or special function modules, or other suitable factors. The authorization criterion can additionally or alternatively comprise blockchain-based authentication of the request and/or receipt of electronic funds applicable to a license. At 1504, if the request for the license for the industrial automation software is not authorized (N at 1504), the process can return to 1502. If at 1504, the request for the license for the industrial automation software is authorized (Y at 1504), the process can proceed to 1506. At 1506, the license component 504 can then mint an NFT 234 comprising the license for the industrial automation software (e.g., to be stored on the industrial blockchain 230).

FIG. 16 is a block flow diagram of a process 1600 for tokenized industrial automation software in accordance with one or more embodiments described herein. At 1602, the blockchain component 212 and/or minting component 210 can store a bill of authorized components (e.g., similar to bill of materials 238) used in the manufacture of a product 242. At 1604, the authorization component 228 can determine whether the product 242 comprises an unauthorized component, other than those represented in the bill of authorized components. At 1606, if the product 242 does not comprise an unauthorized component (N at 1606), the process at return to 1602. If at 1606, the product 242 does comprise an authorized component (Y at 1606), the process 1600 can proceed to 1608. At 1608, the execution component 226 can terminate a warranty for the product 242 tracked via the industrial blockchain 230. According to an embodiment, the minting component 210 can generate an NFT 234 that comprises a bill of authorized components. In this regard, the determination (e.g., by the authorization component 228) of whether the product 242 comprises the unauthorized component can be based on a comparison of the unauthorized component to the NFT 234.

FIG. 17 is a block flow diagram of a process 1700 for tokenized industrial automation software in accordance with one or more embodiments described herein. At 1702, the location component 512 can store, to the blockchain 230, a first geolocation (e.g., region, geofence, country, state, locality, etc.) for which a product 242 generated using industrial automation equipment is authorized for use. At 1704, the location component 512 can further determine a second geolocation (e.g., a current location) of the product 242 (e.g., a current location) and determine whether the first geolocation matches the second geolocation. At 1706, if the second geolocation matches the first geolocation (Y at 1706), the process 1700 can return to 1702. If at 1706, the second geolocation does not match the first geolocation (N at 1706), the process 1700 can proceed to 1708. At 1708, the blockchain component 212 can store data indicative of unauthorized use of the product 242.

Figure 18:
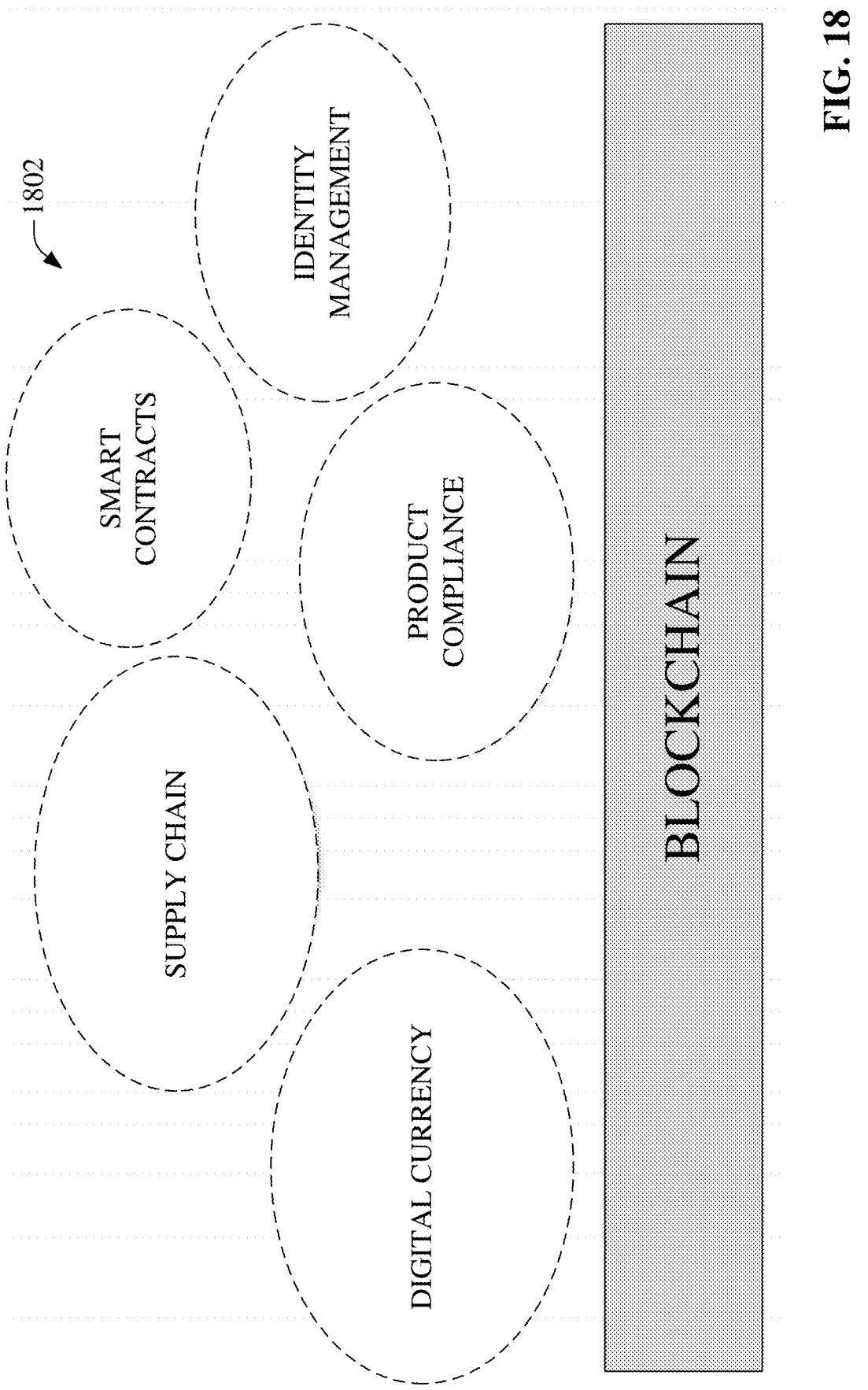
FIG. 18 is a generalized high-level diagram illustrating the relationship between blockchain technology and applications that can leverage blockchains in accordance with one or more embodiments described herein.

A general, high-level overview of blockchain technology is now provided as a background for the industrial-specific applications of blockchain technology discussed herein. FIG. 18 is a generalized high-level diagram illustrating the relationship between blockchain technology and applications 1802 that can leverage blockchains. In general, blockchain is a foundational technology upon which applications can be built to leverage the technology. Digital currency such as Bitcoin is an example application that uses a public blockchain to act as a distributed ledger in a peer-to-peer network. Blockchain technology is also used to implement smart contracts, which allow a set of contractual rules to be programmed and enforced by a network of peer-to-peer devices without requiring a third-party mediator or broker. As discussed herein, one or more embodiments of the present disclosure can include industrial devices and applications that leverage blockchain technology to perform supply chain tracking, verify product compliance, perform identity management, monitor, and record information relating to local manufacturing operations within a single facility (e.g., within the bounds of the plant's intranet), or other such industrial functions.

Figure 19:
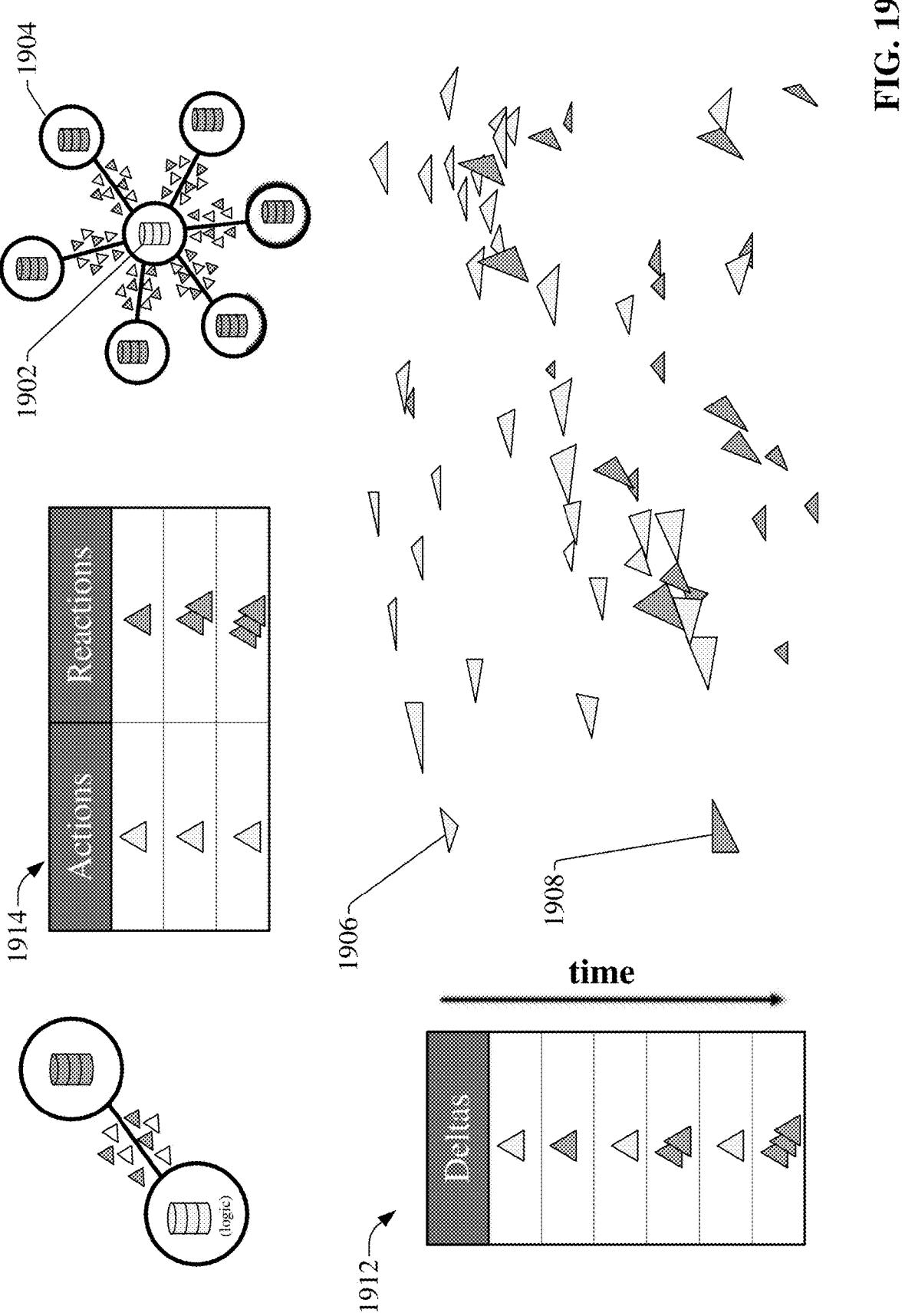
FIG. 19 is a graphic illustrating a centralized model for accessing and modifying data in accordance with one or more embodiments described herein.

Blockchain-based platforms can provide access to data from multiple parties in a decentralized manner, in contrast to platforms that share data using a centralized model. FIG. 19 is a graphic illustrating a centralized model for accessing and modifying data. According to this centralized model, there is a single "golden copy" 1902 of the data being viewed and acted upon by one or more entities 1904 (e.g., systems running applications that leverage the data represented by the golden copy 1902, client devices operated by respective users, etc.). Any of the entities 1904 can copy data maintained on the golden copy 1902 as a whole or in part. This golden copy 1902 of the data model is updated by commanding state changes to the model (an example technique for communicating state changes of objects between components is described in U.S. Pat. No. 9,864,365, which is incorporated herein by reference). These state change instructions are referred to herein as "actions" 1906. Copies and views of the golden copy 1902 remain synchronized by observing changes to the golden copy 1902 of the model. These observed changes are referred to herein as "reactions" 1908. Table 1914 represents a set of actions performed on the data and corresponding observed reactions accumulated as a result of the actions. The collection of actions 1906 and reactions 1908 can be viewed as a set of changes or deltas 1910 ordered by time, as represented by table 1912. This set of deltas 1910 can be "played back" by any number of entities to obtain the same consistent data model, with the golden copy 1902 being the model that is trusted by everyone.

Figure 20:
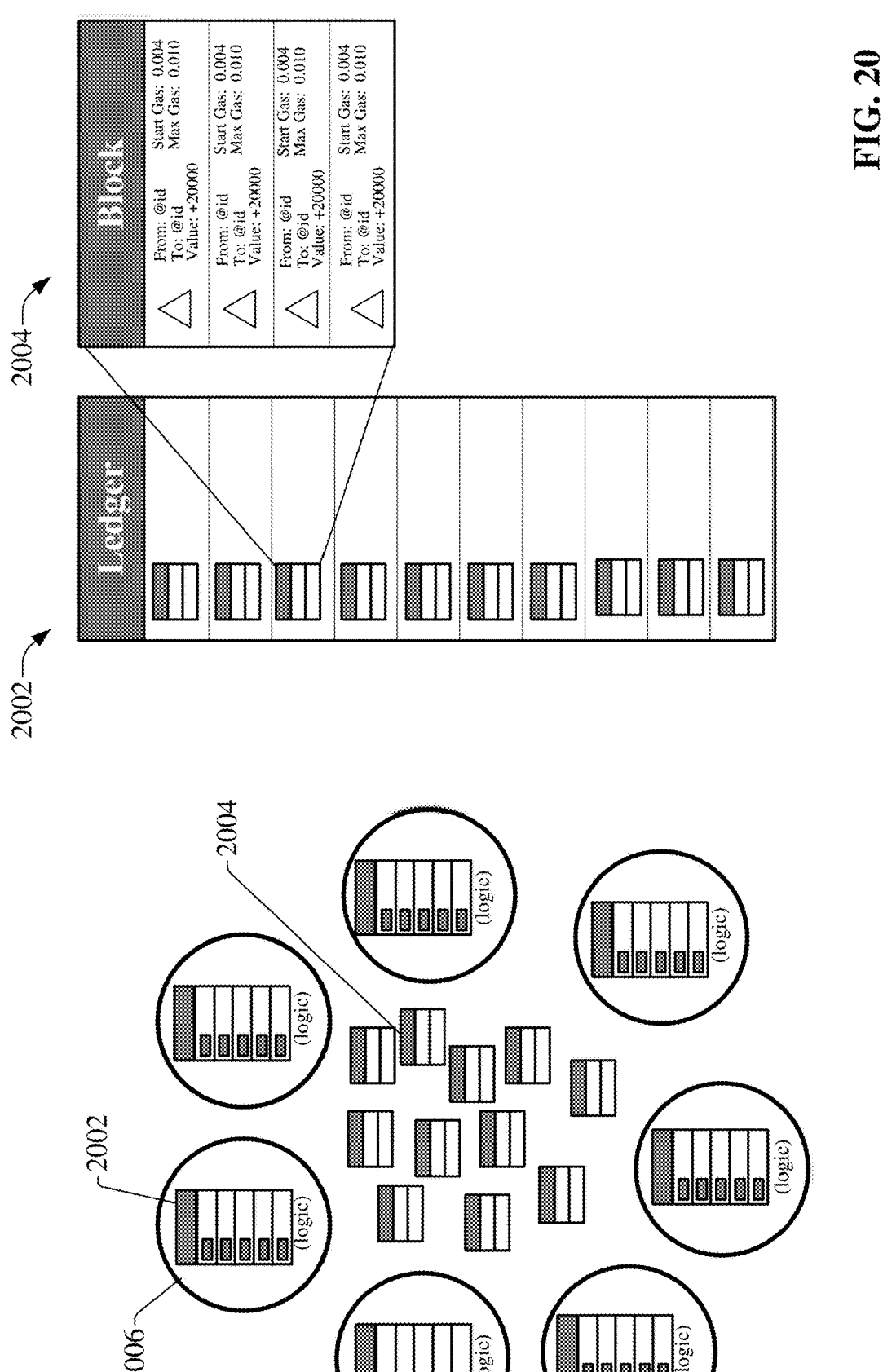
FIG. 20 is a graphic illustrating a decentralized model for accessing and modifying data in accordance with one or more embodiments described herein.

By contrast, blockchain-driven platforms decentralize the data model, eliminating the need to maintain a golden copy 1902 or distributing the multiple coordinated versions of the truth. FIG. 20 is a graphic illustrating a decentralized model. In a decentralized model, all entities 2006 that interact with the data have a copy of the data, and all entities work to keep the data model's transactions ordered and consistent. Blocks 2004 of changes to the data are recorded as a transaction. A distributed ledger 2002 of all these changes is maintained by all entities 2006 (or nodes or participants) that participate in the platform. If all entities 2006 apply the changes to their own copy of the data, then the copies remain consistent across the entities 2006 without the need for a single golden copy. Each entity maintains a copy of the ledger 2002, which represents a continuous chain of transaction blocks 2004, hence the term "blockchain." When a transaction is performed on the data by one of the entities 2006, all entities 2006 process the transaction and determine the validity of the transaction. If a consensus among the entities 2006 is reached regarding the transaction's validity, each entity updates its copy of the ledger 2002 accordingly.

Figure 21:
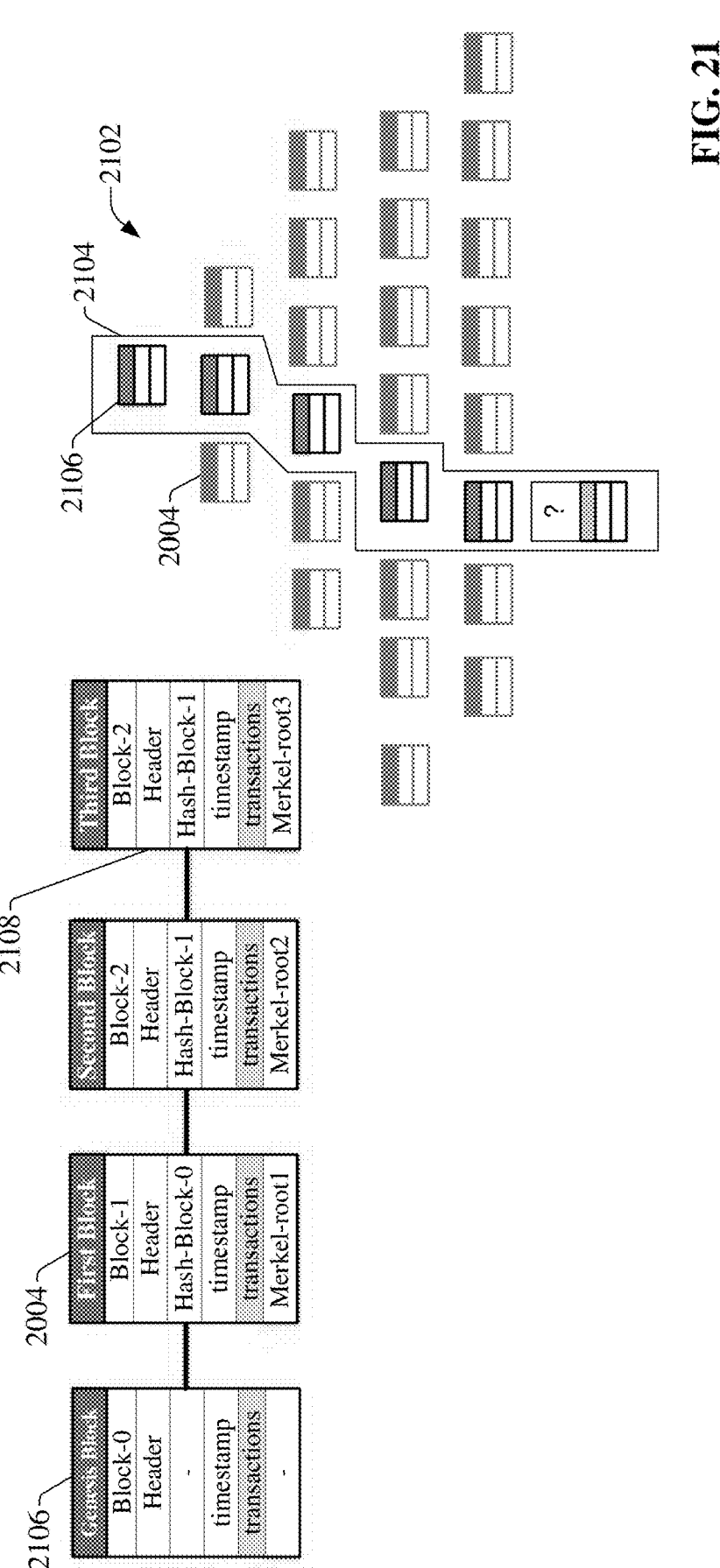
FIG. 21 is a graphic illustrating an example blockchain architecture in accordance with one or more embodiments described herein.

A blockchain consists of a data structure that orders blocks and links the blocks cryptographically, thereby acting as an immutable, verifiable, distributed ledger. Blockchains require no central authority; instead, trust is established and enforced cryptographically, with participating nodes (e.g., devices associated with entities 2006) acting as a consortium and voting on the validity of a block using a consensus mechanism to manage the distributed ledger. FIG. 21 is a graphic illustrating a blockchain architecture. Blockchains are a linked hierarchical list 2102 of transaction blocks 2004, where chains of related, linked transaction blocks 2004 within the hierarchy (e.g., chain 2104) stem from an initial genesis block 2106. Each block 2004 has a cryptographic identity, which is calculated by the header data 2108 in the block. Each block 2004 contains the hash of the previous block in the chain.

Figure 22:
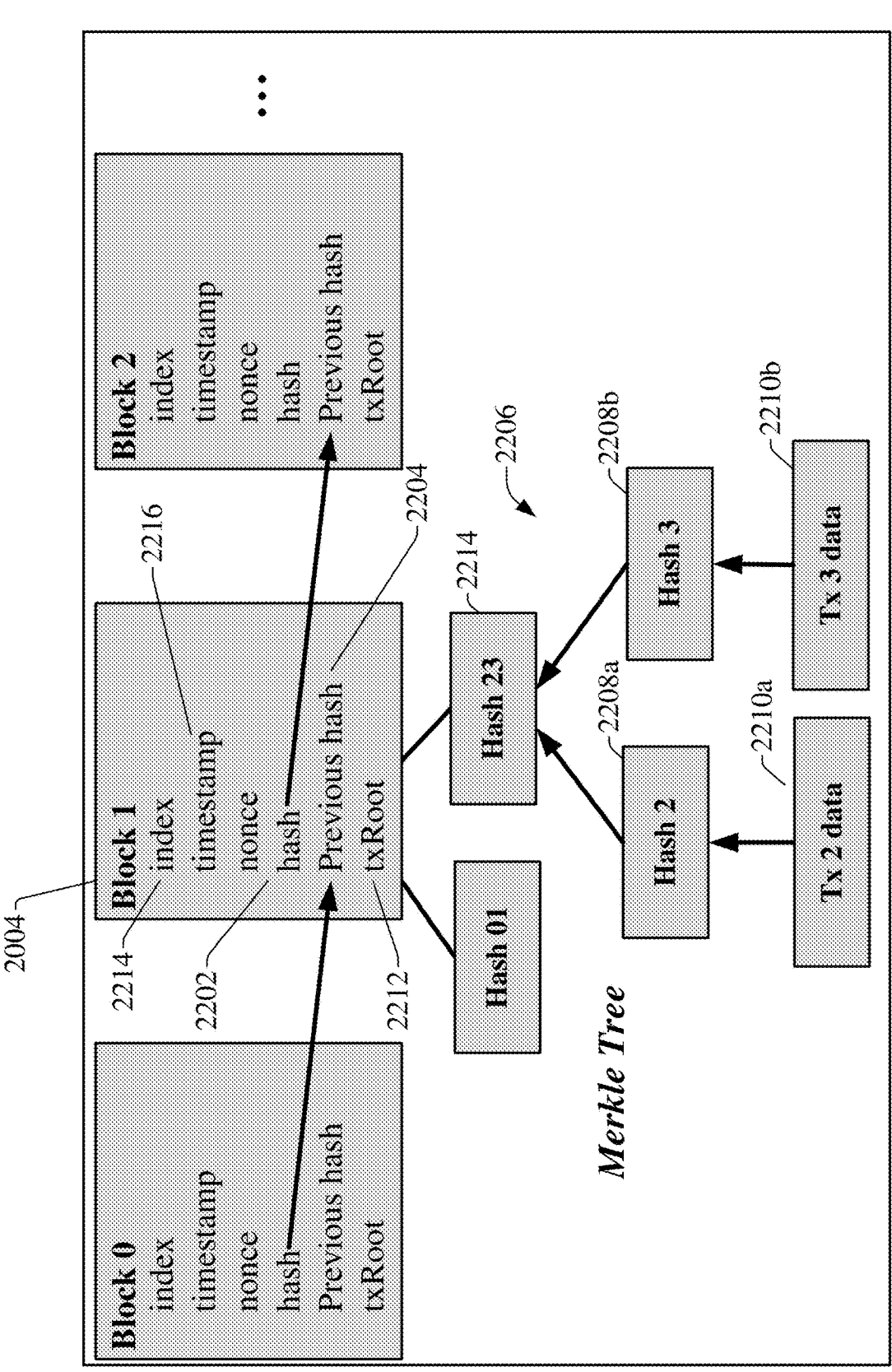
FIG. 22 is a diagram illustrating a general architecture of a blockchain in accordance with one or more embodiments described herein.

FIG. 22 is a diagram illustrating a general architecture of an example blockchain. Data 2210 associated with the block's transactions is hashed, and the collection of transaction data 2210 and their associated hashes 2208 create a Merkle tree 2206 of hashes 2208 (only two items of data 2210 are shown in FIG. 22 for clarity; however, a block 2004 can be associated with more than two transactions). In the illustrated example, each data item 2210*a* and 2210*b* is hashed to yield two corresponding hash values 2208*a* and 2208*b*. These two hashes 2208*a* and 2208*b* are combined into another hash value 2202 at the next higher level in the Merkle tree hierarchy. Hash values at a given level of the Merkle tree can be combined with other hash values on that level to yield hash values at the next higher level until the top of the Merkle tree hierarchy is reached.

The Merkle tree 2206 is stored separately from the block 2004, and only the root fingerprint 2212 (the top hash) is stored in the block 2004. Each block 2004 also contains a hash 2204 of the content of the immediately preceding block in the chain. For each block 2004, the Merkle tree of hashes 2208 and the hash 2204 of the previous block in the chain are used to create the hash 2202 for the block. The data 2210 is stored in the Merkle tree 2206 separately from the block 2004, with the root fingerprint 2212 being the only part of the Merkle tree 2206 stored in the block 2004. This nesting of cryptographic hash values yields a digital fingerprint that renders unauthorized tampering difficult. Compounded with the chaining of transaction blocks 2004, the blockchain becomes increasingly difficult to hack, producing a level of trustworthiness that increases over time. Improperly modifying a block 2004 would require tampering with the entire transaction history, rendering tampering nearly impossible. In this way, a verifiable, tamper-proof ledger of transactions can be efficiently maintained.

Figure 23:
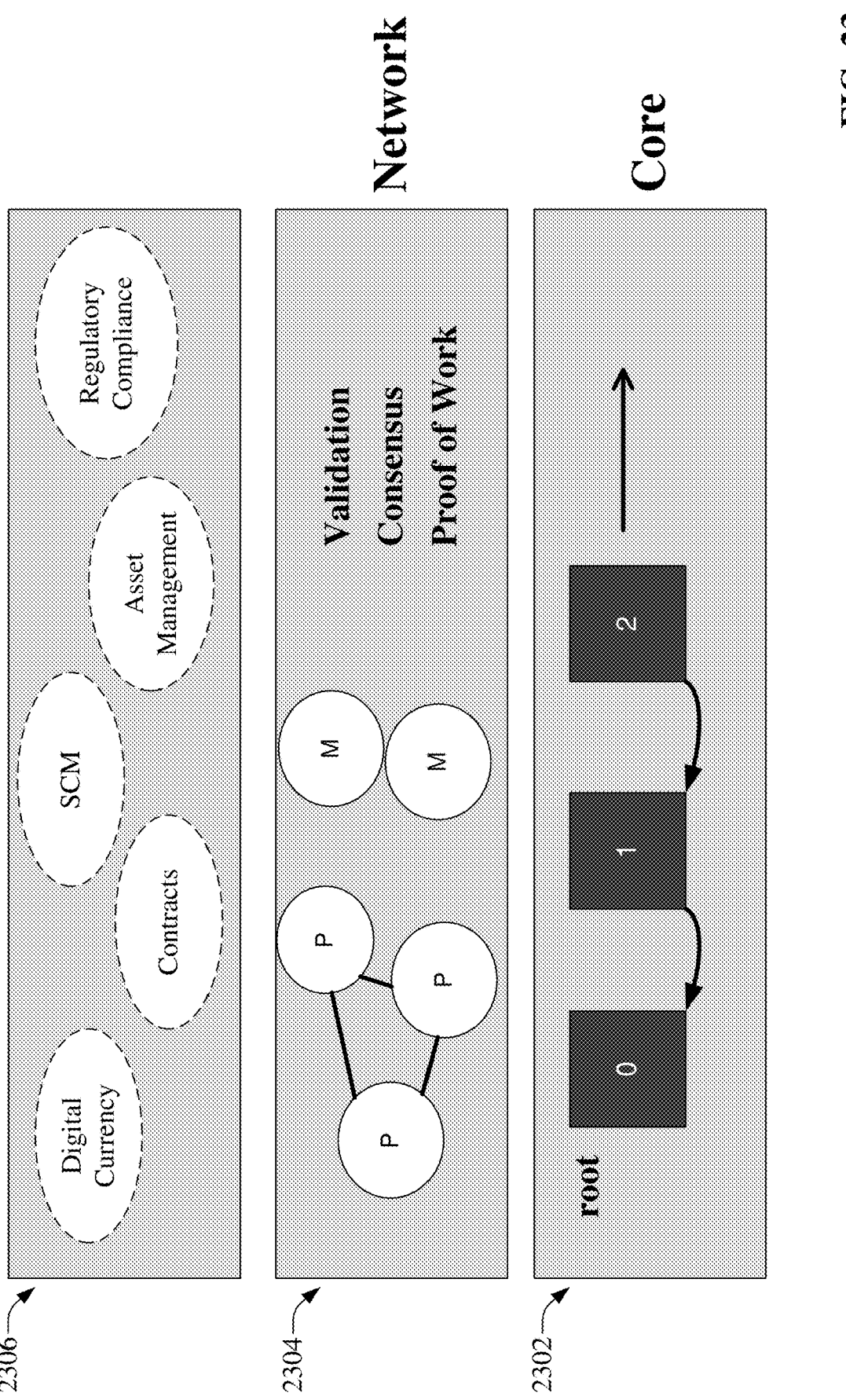
FIG. 23 is a diagram illustrating a generalized architecture of an example blockchain platform in accordance with one or more embodiments described herein.

FIG. 23 is a diagram illustrating a generalized architecture of a blockchain platform. The core blockchain functionality 2302 (the blockchain creation and management features described above) is implemented on a network 2304 of participating devices or nodes. The core blockchain ledger is distributed throughout the network, and is independently validated by network members. In a public model, the network 2304 is purely peer-to-peer with no central trust authority. Instead of a central trust authority, network peers are responsible for validation and decentralized consensus for acceptance of new transactions (that is, new blocks 2004 representing new transactions) into the blockchain. Public blockchains are secured by the amount of work required to create a new block 2004. This proof-of-work model can prevent network peers from improperly hijacking or tampering with the blockchain. Private blockchain models—including blockchain applications used within an industrial facility as will be described herein—can employ a central authority to manage the ledger, user identities, and creation of new blocks.

Applications 2306 that employ blockchains are constructed on top of the network layer, which exposes the core blockchain functions. Participants in the network 2304 (the peer devices) are uniquely identified with digital signatures granted by the network. Participant identities may be anonymous depending on the type of blockchain network model (e.g., public, or private). In all cases, transactions are published, visible, and verifiable on the blockchain.

Figure 24:
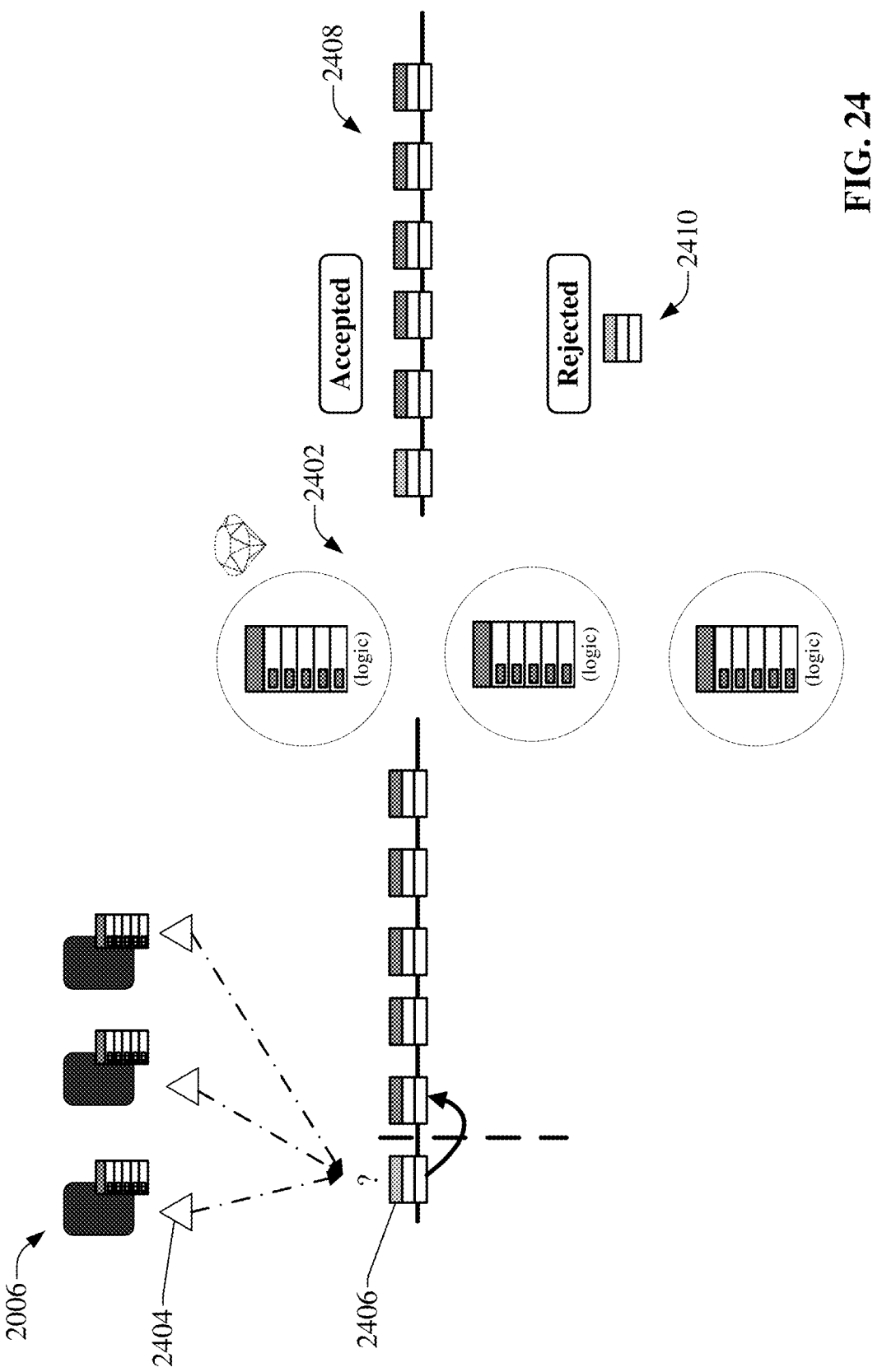
FIG. 24 is a generalized diagram illustrating creation of blocks and validation of blocks via consensus-based validation in accordance with one or more embodiments described herein.

FIG. 24 is a generalized diagram illustrating creation of blocks and validation of blocks via consensus-based validation. Single transactions 2404 performed by entities 2006 (participants in the blockchain network) are gathered into blocks 2406 by programmatic components executing on the entities 2006 referred to as "miners" 2402. Miners 2402 possess the entire Merkle tree for the gathered transactions and compete to build a valid block out of the Merkle tree. The first miner 2402 to create a block is rewarded. The block is then validated by the other entities 2006 based on the hashes. If valid, the block is added to the blockchain 2408.

Since these blocks 2406 are created and validated in parallel, different versions of the truth can be generated. In these cases, the peers (entities 2006) vote on which block should be used. Regardless of the final set of blocks, all choices are most likely valid. The participants in the blockchain network can validate transactions and reject invalid or nefarious transactions 2410 (e.g., spending the same money twice in the case of digital currency applications). The system is ultimately consistent and valid.

Figure 25:
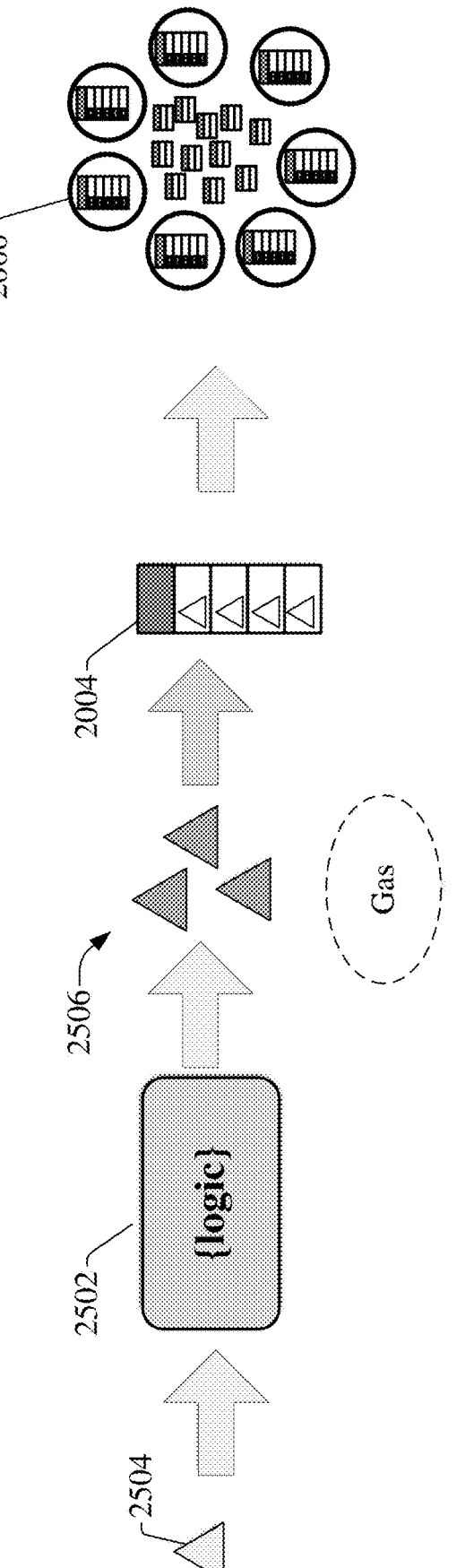
FIG. 25 is a generalized diagram illustrating implementation of smart contracts within a blockchain-driven system in accordance with one or more embodiments described herein.

Some blockchain platforms are also capable of implementing and enforcing smart contracts, which define rules or agreements between participants in the blockchain network. FIG. 25 is a generalized diagram illustrating implementation of smart contracts within a blockchain-driven system. In general, smart contracts are sets of logic 2502 that execute on the blockchain and generate new types of transactions in accordance with rules defined by the logic. The smart contract logic 2502 is executed by the participants of the blockchain. When a smart contract transaction 2504 is generated, the logic 2502 executes on the transaction 2504 and can create several new transactions 2506 designed to satisfy the contract. On the Ethereum platform, units of processing "fees" must be provided by an initiator of a smart contract transaction in order to execute the transaction. On the Ethereum platform, these fees are referred to as Ether or "gas." The amount of gas required to execute a transaction is generally proportional to the amount of work required to execute the transaction. The more complex the transaction, the more gas must be spent to execute the transaction. These processing "fees" can be used to prioritize transactions based on relative values of the transactions, and can also protect against Denial of Service attacks (e.g., attacks that place the contract's logic in an infinite loop). Work on selected transactions can be prioritized by assigning extra gas to the transactions.

Figure 26:
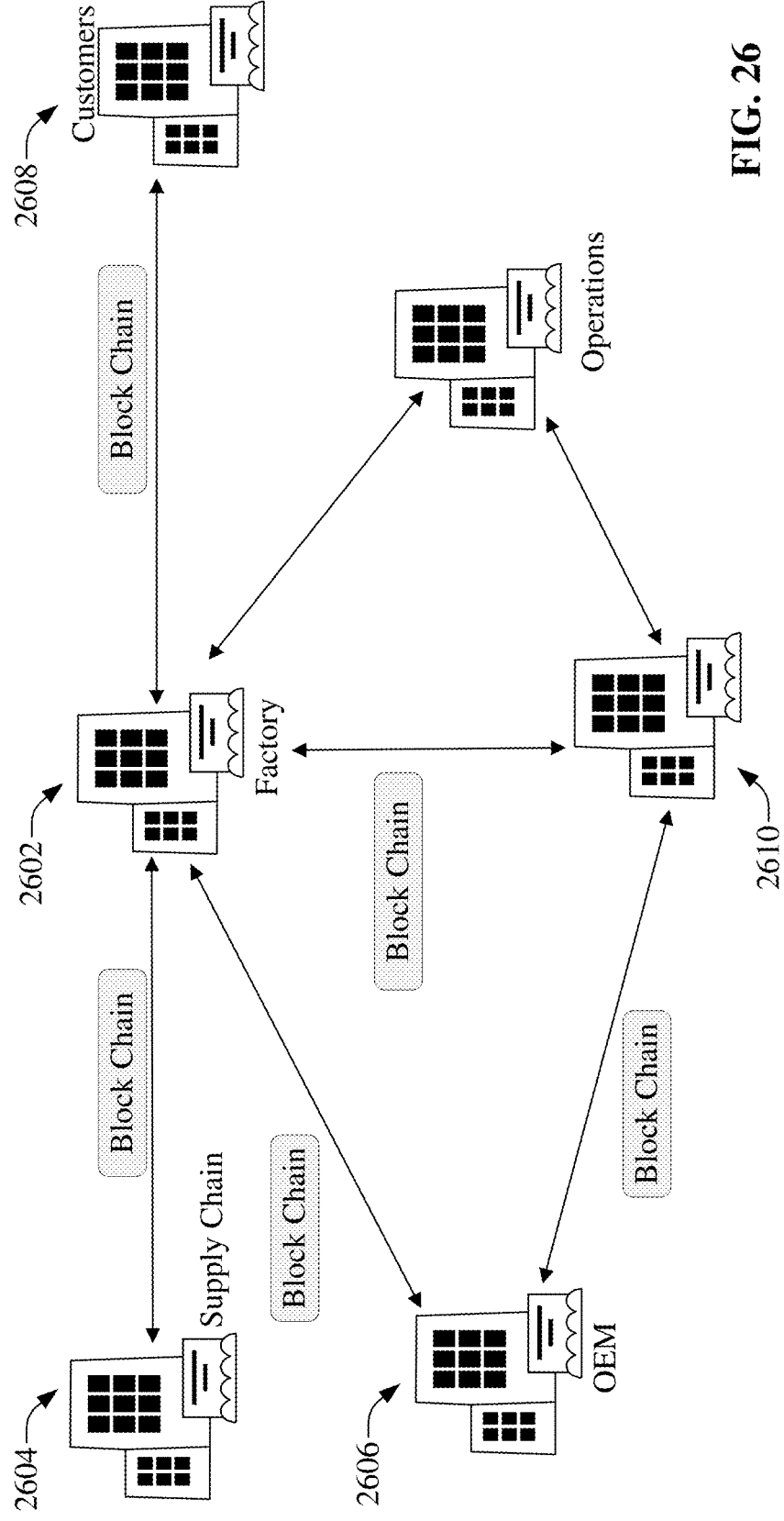
FIG. 26 is a high-level overview of entities and enterprises within an industrial supply and distribution chain within which industrial-specific blockchains can be utilized in accordance with one or more embodiments described herein.

Various embodiments described herein leverage aspects of blockchain platforms within the context of industrial facilities, industrial enterprises, and manufacturing and distribution supply chains. To this end, industrial devices such as industrial controllers, motor drives, data historians, telemetry devices, HMIs, and other such industrial devices are configured to support creation, validation, and sharing of blockchains. FIG. 26 is a high-level overview of entities and enterprises within an industrial supply and distribution chain within which industrial-specific blockchains can be utilized. In general, blockchain-enabled industrial devices can utilize blockchain technology in connection with such tasks as asset and product lifecycle management within a factory 2602; device, machine, line, or factory configuration integrity tracking; regulatory compliance verification; auditing of lock out/tag out safety procedures within the factory 2602; customer/partner entitlements management, management and tracking of supply chains 2604 across enterprise boundaries; inventory management across a supply chain; contracts management; tracking of manufactured products across enterprises of a supply chain or within a factory 2602; or other applications to be discussed herein.

The use of blockchains between industrial enterprises can also open the possibility of subscription-based serves between OEMs 2606 and owners of factories 2602, or between a manufacturing entity and its customers. Blockchains can also be used to track manufactured products to the end consumers 2608, and public blockchain data generated by a product's traversal through the manufacturing and supply chain can be accessed by consumers 2608 to obtain information about their purchased products. A device vendor 2610 can manufacture and provide blockchain-enabled industrial devices that are used within industrial factories 2602, OEM facilities 2606, and other enterprises to facilitate blockchain-driven industrial applications. The device vendor 2610 can also act as a trust authority for blockchain-driven systems that are implemented by the blockchain-enabled industrial devices. Robust identity management for organizations, people, and products that participate in an industrial blockchain system can ensure the trustworthiness of the participants and the blockchain data. Both public and private blockchain models can be implemented depending on the needs of the industrial application using the platform.

Figure 27:
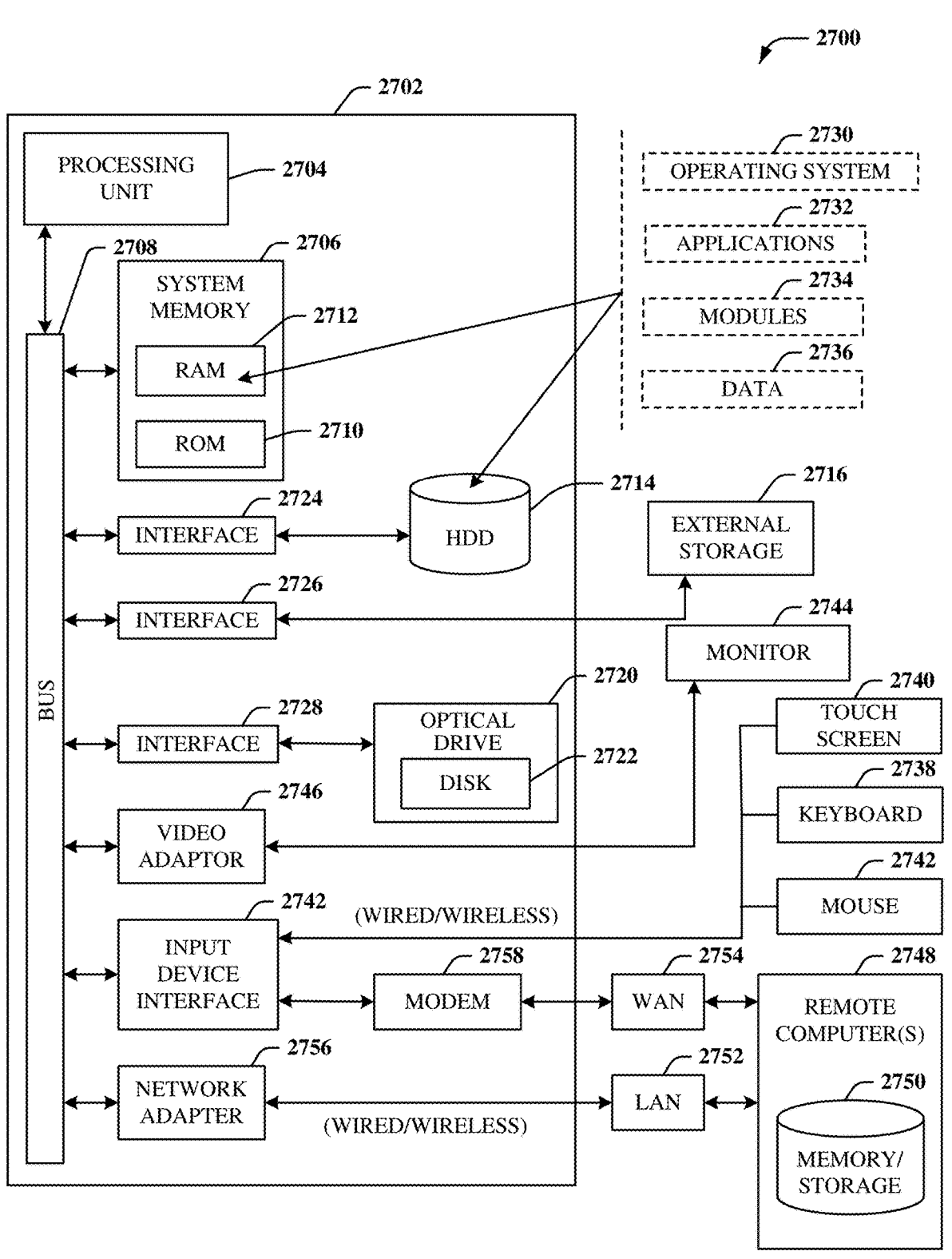
FIG. 27 is an example computing environment in accordance with one or more embodiments described herein.
Figure 28:
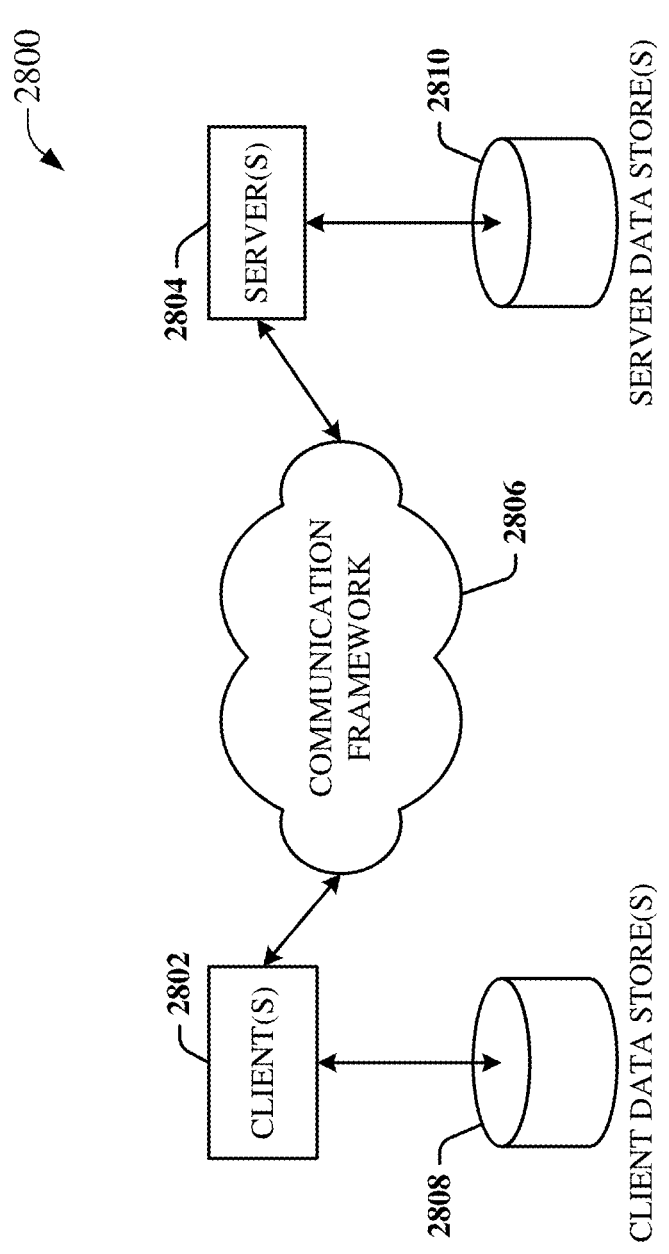
FIG. 28 is an example networking environment in accordance with one or more embodiments described herein.

In order to provide a context for the various aspects of the disclosed subject matter, FIGS. 27 and 28 as well as the following discussion are intended to provide a brief, general description of a suitable environment in which the various aspects of the disclosed subject matter can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared, and other wireless media.

With reference again to FIG. 27, the example environment 2700 for implementing various embodiments of the aspects described herein includes a computer 2702, the computer 2702 including a processing unit 2704, a system memory 2706 and a system bus 2708. The system bus 2708 couples system components including, but not limited to, the system memory 2706 to the processing unit 2704. The processing unit 2704 can be any of various commercially available processors. Dual microprocessors and other multi-processor architectures can also be employed as the processing unit 2704.

The system bus 2708 can be any of several types of bus structure that can further interconnect to a memory bus (with or without a memory controller), a peripheral bus, and a local bus using any of a variety of commercially available bus architectures. The system memory 2706 includes ROM 2710 and RAM 2712. A basic input/output system (BIOS) can be stored in a non-volatile memory such as ROM, erasable programmable read only memory (EPROM), EEPROM, which BIOS contains the basic routines that help to transfer information between elements within the computer 2702, such as during startup. The RAM 2712 can also include a high-speed RAM such as static RAM for caching data.

The computer 2702 further includes an internal hard disk drive (HDD) 2714 (e.g., EIDE, SATA), one or more external storage devices 2716 (e.g., a magnetic floppy disk drive (FDD) 2716, a memory stick or flash drive reader, a memory card reader, etc.) and an optical disk drive 2720 (e.g., which can read or write from a CD-ROM disc, a DVD, a BD, etc.). While the internal HDD 2714 is illustrated as located within the computer 2702, the internal HDD 2714 can also be configured for external use in a suitable chassis (not shown). Additionally, while not shown in environment 2700, a solid state drive (SSD) could be used in addition to, or in place of, an HDD 2714. The HDD 2714, external storage device(s) 2716 and optical disk drive 2720 can be connected to the system bus 2708 by an HDD interface 2724, an external storage interface 2726 and an optical drive interface 2728, respectively. The interface 2724 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 2702, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2712, including an operating system 2730, one or more application programs 2732, other program modules 2734 and program data 2736. All or portions of the operating system, applications, modules, and/or data can also be cached in the RAM 2712. The systems and methods described herein can be implemented utilizing various commercially available operating systems or combinations of operating systems.

Computer 2702 can optionally comprise emulation technologies. For example, a hypervisor, simulation software (not shown), or other intermediary can emulate a hardware environment for operating system 2730, and the emulated hardware can optionally be different from the hardware illustrated in FIG. 27. In such an embodiment, operating system 2730 can comprise one virtual machine (VM) of multiple VMs hosted at computer 2702. Furthermore, operating system 2730 can provide runtime environments, such as the Java runtime environment or the .NET framework, for application programs 2732. Runtime environments are consistent execution environments that allow application programs 2732 to run on any operating system that includes the runtime environment. Similarly, operating system 2730 can support containers, and application programs 2732 can be in the form of containers, which are lightweight, standalone, executable packages of software that include, e.g., code, runtime, system tools, system libraries and settings for an application.

Further, computer 2702 can be enable with a security module, such as a trusted processing module (TPM). For instance, with a TPM, boot components hash next in time boot components, and wait for a match of results to secured values, before loading a next boot component. This process can take place at any layer in the code execution stack of computer 2702, e.g., applied at the application execution level or at the operating system (OS) kernel level, thereby enabling security at any level of code execution.

A user can enter commands and information into the computer 2702 through one or more wired/wireless input devices, e.g., a keyboard 2738, a touch screen 2740, and a pointing device, such as a mouse 2742. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2704 through an input device interface 2744 that can be coupled to the system bus 2708, but can be connected by other interfaces, such as a parallel port, an IEEE 1394 serial port, a game port, a USB port, an IR interface, a BLUETOOTH® interface, etc.

A monitor 2744 or other type of display device can be also connected to the system bus 2708 via an interface, such as a video adapter 2746. In addition to the monitor 2744, a computer typically includes other peripheral output devices (not shown), such as speakers, printers, etc.

The computer 2702 can operate in a networked environment using logical connections via wired and/or wireless communications to one or more remote computers, such as a remote computer(s) 2748. The remote computer(s) 2748 can be a workstation, a server computer, a router, a personal computer, portable computer, microprocessor-based entertainment appliance, a peer device or other common network node, and typically includes many or all of the elements described relative to the computer 2702, although, for purposes of brevity, only a memory/storage device 2750 is illustrated. The logical connections depicted include wired/wireless connectivity to a local area network (LAN) 2752 and/or larger networks, e.g., a wide area network (WAN) 2754. Such LAN and WAN networking environments are commonplace in offices and companies, and facilitate enterprise-wide computer networks, such as intranets, all of which can connect to a global communications network, e.g., the Internet.

When used in a LAN networking environment, the computer 2702 can be connected to the local network 2752 through a wired and/or wireless communication network interface or adapter 2756. The adapter 2756 can facilitate wired or wireless communication to the LAN 2752, which can also include a wireless access point (AP) disposed thereon for communicating with the adapter 2756 in a wireless mode.

When used in a WAN networking environment, the computer 2702 can include a modem 2758 or can be connected to a communications server on the WAN 2754 via other means for establishing communications over the WAN 2754, such as by way of the Internet. The modem 2758, which can be internal or external and a wired or wireless device, can be connected to the system bus 2708 via the input device interface 2742. In a networked environment, program modules depicted relative to the computer 2702 or portions thereof, can be stored in the remote memory/storage device 2750. It will be appreciated that the network connections shown are example and other means of establishing a communications link between the computers can be used.

When used in either a LAN or WAN networking environment, the computer 2702 can access cloud storage systems or other network-based storage systems in addition to, or in place of, external storage devices 2716 as described above. Generally, a connection between the computer 2702 and a cloud storage system can be established over a LAN 2752 or WAN 2754 e.g., by the adapter 2756 or modem 2758, respectively. Upon connecting the computer 2702 to an associated cloud storage system, the external storage interface 2726 can, with the aid of the adapter 2756 and/or modem 2758, manage storage provided by the cloud storage system as it would other types of external storage. For instance, the external storage interface 2726 can be configured to provide access to cloud storage sources as if those sources were physically connected to the computer 2702.

The computer 2702 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 28 is a schematic block diagram of a sample computing environment 2800 with which the disclosed subject matter can interact. The sample computing environment 2800 includes one or more client(s) 2802. The client(s) 2802 can be hardware and/or software (e.g., threads, processes, computing devices). The sample computing environment 2800 also includes one or more server(s) 2804. The server(s) 2804 can also be hardware and/or software (e.g., threads, processes, computing devices). The servers 2804 can house threads to perform transformations by employing one or more embodiments as described herein, for example. One possible communication between a client 2802 and servers 2804 can be in the form of a data packet adapted to be transmitted between two or more computer processes. The sample computing environment 2800 includes a communication framework 2806 that can be employed to facilitate communications between the client(s) 2802 and the server(s) 2804. The client(s) 2802 are operably connected to one or more client data store(s) 2808 that can be employed to store information local to the client(s) 2802. Similarly, the server(s) 2804 are operably connected to one or more server data store(s) 2810 that can be employed to store information local to the servers 2804.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. An industrial automation system, comprising:
   a memory that stores executable components; and
   a processor, operatively coupled to the memory, that executes the executable components, the executable components comprising:
   a contract component that determines whether a product generated using industrial automation equipment satisfies defined conditions of a smart contract, the defined conditions comprising at least a measure of a raw material used in the product, a rate of production of the product, and a quantity of units of the product produced by the industrial automation equipment;
   an execution component that, in response to the product being determined to satisfy the defined conditions, executes a defined term of the smart contract, wherein the defined term comprises at least initiation of an order for the raw material, initiation of a payment for the order, and sending of a message indicating an output of the product to a registered participant of the smart contract; and
   a minting component that, in response to detecting that a maintenance operation has been performed on the industrial automation equipment,
   generates a non-fungible token (NFT) that records maintenance information relating to the maintenance operation, the maintenance information comprising a time at which the maintenance operation was performed, an identity of a component or device that was replaced as part of the maintenance operation, and an identity of maintenance personnel who performed the maintenance operation, and
   stores the NFT on a private blockchain via distributed devices on a plant network on which the industrial automation equipment resides.

2. The industrial automation system of claim 1, wherein the smart contract comprises a first smart contract, and the defined term further comprises executing one or more other smart contracts, other than the first smart contract.

3. The industrial automation system of claim 1, wherein the NFT is a first NFT, the defined term further comprises an instruction to mint a second NFT associated with the product, and the minting component mints the second NFT.

4. The industrial automation system of claim 1, wherein the defined term further comprises retrieving an electronic payment for the product according to the smart contract.

5. The industrial automation system of claim 4, wherein the electronic payment comprises a transfer of a cryptographic asset stored on a blockchain.

6. The industrial automation system of claim 1, wherein the industrial automation equipment is controlled by an industrial automation controller, and output of the industrial automation equipment, comprising the product, are determined by the industrial automation controller.

7. The industrial automation system of claim 1, wherein the defined conditions comprises first defined conditions, and the execution component executes the defined term of the smart contract further in response to output of the industrial automation equipment being determined to satisfy second defined conditions of the smart contract.

8. A method, comprising:

determining, by an industrial device comprising a processor, whether a product manufactured using industrial automation equipment that includes the industrial device satisfies defined conditions of a smart contract, wherein the defined conditions comprises at least a measure of a raw material used in the product, a rate of production of the product, and a quantity of units of the product produced by the industrial automation equipment;

in response to determining that the product satisfies the defined conditions, executing, by the industrial device, a defined term of the smart contract, wherein the defined term comprises at least initiation of an order for the raw material, initiation of a payment for the order, and generation of a message indicating an output of the product and directed to a registered participant of the smart contract; and in response to detecting that a maintenance operation has been performed on the industrial automation equipment:

generating, by the industrial device, a non-fungible token (NFT) that records maintenance information relating to the maintenance operation, the maintenance information comprising a time at which the maintenance operation was performed, an identity of a component or device that was replaced as part of the maintenance operation, and an identity of maintenance personnel who performed the maintenance operation; and storing, by the industrial device, the NFT on a private blockchain via distributed devices on a plant network on which the industrial automation equipment resides.

9. The method of claim 8, wherein the smart contract comprises a first smart contract, and the defined term comprises executing one or more other smart contracts, other than the first smart contract.

10. The method of claim 8, wherein the NFT is a first NFT, the defined term further comprises an instruction to mint a second NFT associated with the product, and the method further comprises minting, by the industrial device, the second NFT.

11. The method of claim 8, wherein the defined term further comprises retrieving an electronic payment for the product according to the smart contract.

12. The method of claim 11, wherein the electronic payment comprises a transfer of a cryptographic asset stored on a blockchain.

13. The method of claim 8, wherein the industrial device comprises an industrial controller.

14. The method of claim 8, wherein the defined condition comprises a first defined condition, and the executing of the defined term comprises executing the defined term of the smart contract further in response to output of the industrial automation equipment being determined to satisfy a second defined condition of the smart contract.

15. A non-transitory computer-readable medium having stored thereon instructions that, in response to execution, cause an industrial device comprising a processor to perform operations, the operations comprising:

determining whether a product manufactured using industrial automation equipment that includes the industrial device satisfies defined conditions of a smart contract, wherein the defined conditions comprises at least a measure of a raw material used in the product, a rate of production of the product, and a quantity of units of the product produced by the industrial automation equipment;

in response to determining that the product satisfies the defined conditions, executing a defined term of the smart contract, wherein the defined term comprises at least initiation of an order for the raw material, initiation of a payment for the order, and generation of a message indicating an output of the product and directed to a registered participant of the smart contract; and in response to detecting that a maintenance operation has been performed on the industrial automation equipment:

generating a non-fungible token (NFT) that records maintenance information relating to the maintenance operation, the maintenance information comprising a time at which the maintenance operation was performed, an identity of a component or device that was replaced as part of the maintenance operation, and an identity of maintenance personnel who performed the maintenance operation; and storing the NFT on a private blockchain via distributed devices on a plant network on which the industrial automation equipment resides.

16. The non-transitory computer-readable medium of claim 15, wherein the NFT is a first NFT, the defined term further comprises an instruction to mint a second NFT associated with the product, and the operations further comprise minting the second NFT.

17. The industrial automation system of claim 1, wherein the maintenance information is private maintenance information stored in a manner that permits the private maintenance information to be accessible only to devices on the plant network, and the minting component is further configured to, in response to detecting that the maintenance operation has been performed, generate a public blockchain that records public maintenance information relating to the maintenance operation, and store the public blockchain in a manner that permits the public maintenance information to be accessed by an authorized entity that is not on the plant network.

18. The industrial automation system of claim 17, wherein the public maintenance information comprises at least one of operating hours for the industrial equipment, power cycles of the industrial equipment, or the identity of the component or device that was replaced.

19. The non-transitory computer-readable medium of claim 15, wherein the smart contract comprises a first smart contract, and the defined term further comprises executing one or more other smart contracts, other than the first smart contract.

20. The non-transitory computer-readable medium of claim 15, wherein the defined term further comprises retrieving an electronic payment for the product according to the smart contract.

* * * * *